(12) United States Patent
Jang et al.

(10) Patent No.: US 9,964,806 B2
(45) Date of Patent: May 8, 2018

(54) DISPLAY DEVICE

(71) Applicant: Samsung Display Co. Ltd., Yongin-si, Gyeonggi-do (KR)

(72) Inventors: Yun Jang, Seongnam-si (KR); Nam Seok Roh, Seongnam-si (KR); Seung Beom Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 99 days.

(21) Appl. No.: 15/229,706

(22) Filed: Aug. 5, 2016

(65) Prior Publication Data

US 2017/0235191 A1    Aug. 17, 2017

(30) Foreign Application Priority Data

Feb. 17, 2016  (KR) .................. 10-2016-0018272

(51) Int. Cl.
*G02F 1/1335* (2006.01)
*G02F 1/1337* (2006.01)
(Continued)

(52) U.S. Cl.
CPC ...... *G02F 1/133617* (2013.01); *C09K 19/603* (2013.01); *G02F 1/13378* (2013.01);
(Continued)

(58) Field of Classification Search
CPC ......... G02F 1/133617; G02F 1/133504; G02F 1/133512; G02F 1/133528;
(Continued)

(56) References Cited

U.S. PATENT DOCUMENTS

| | | |
|---|---|---|
| 2002/0008841 A1 | 1/2002 | Ohmuro |
| 2004/0125305 A1 | 7/2004 | Nishi et al. |
| 2013/0344577 A1 | 12/2013 | Kilickiran et al. |

FOREIGN PATENT DOCUMENTS

| | | |
|---|---|---|
| GB | 2354336 A | 3/2001 |
| KR | 1020060113160 A | 11/2006 |

(Continued)

OTHER PUBLICATIONS

European Search Report dated Feb. 24, 2017, issued by the EPO for European patent application No. 16186460.8 filed Aug. 31, 2016.

(Continued)

*Primary Examiner* — Joseph L Williams
(74) *Attorney, Agent, or Firm* — Cantor Colburn LLP

(57) ABSTRACT

A display device includes a plurality of pixels; a first substrate including a pixel electrode disposed in a pixel of the plurality of pixels, a second substrate facing the first substrate and including a color adjusting pattern, which is disposed in the pixel of the plurality of pixels, and a common electrode, which is disposed on the color adjusting patterns, and a liquid crystal layer interposed between the first substrate and the second substrate and including a liquid crystal and a dichroic dye, wherein the plurality of pixels include a first-color pixel, which is configured to display a first color, and a second-color pixel, which is configured to display a second color different from the first color, and the color adjusting pattern includes a first color adjusting pattern, which is disposed in the first-color pixel, and a second color adjusting pattern, which is disposed in the second-color pixel.

27 Claims, 14 Drawing Sheets

(51) Int. Cl.
  *C09K 19/60* (2006.01)
  *G02F 1/1343* (2006.01)
  *G02F 1/137* (2006.01)
  *G02F 1/1333* (2006.01)

(52) U.S. Cl.
  CPC ...... *G02F 1/13439* (2013.01); *G02F 1/13725* (2013.01); *G02F 1/133504* (2013.01); *G02F 1/133512* (2013.01); *G02F 1/133528* (2013.01); *G02F 1/133621* (2013.01); *G02F 1/134336* (2013.01); *G02F 1/134363* (2013.01); *G02F 2001/133357* (2013.01); *G02F 2001/133614* (2013.01); *G02F 2001/133742* (2013.01); *G02F 2001/134372* (2013.01); *G02F 2201/121* (2013.01); *G02F 2201/123* (2013.01); *G02F 2202/04* (2013.01); *G02F 2202/36* (2013.01); *G02F 2203/03* (2013.01); *G02F 2203/05* (2013.01)

(58) Field of Classification Search
  CPC ........... G02F 1/134336; G02F 1/13439; G02F 1/13378; G02F 1/133621
  See application file for complete search history.

(56) References Cited

FOREIGN PATENT DOCUMENTS

| KR | 1020110077932 A | 7/2011 |
| KR | 1020150039066 A | 4/2015 |

OTHER PUBLICATIONS

Hiroki Iwanaga, "Development of Highly Soluble Anthraquinone Dichroic Dyes and Their Application to Three-Layer Guest-Host Liquid Crystal Displays", Materials 2009, vol. 2, 1636-1661.

Hiroki Iwanaga, et al., "Properties of novel yellow anthraquinone dichroic dyes with naphthylthio groups for guest-host liquid crystal displays", Journal of Molecular Structure 975 (2010), pp. 110-114.

Vladimir Chigrinov, et al., "Non Polarizer Guest-Host mode based on Dyes with Negative Dichroism", Jpn. J. Appl. Phys., vol. 42 (2003), pp. 1297-1300.

Zhenyue Luo, et al., "Quantum Dots Enhanced Liquid Displays", Journal of Display Technology, vol. 10, No. 12, pp. 987-990, Dec. 2014.

DISPLAY DEVICE

This application claims priority to Korean Patent Application No. 10-2016-0018272 filed on Feb. 17, 2016, and all the benefits accruing therefrom under 35 U.S.C. § 119, the content of which in its entirety is herein incorporated by reference.

BACKGROUND

1. Field

The present disclosure relates to a display device, and more particularly, to a display device comprising a liquid crystal layer.

2. Description of the Related Art

A liquid crystal display (LCD) device is one of the most widely used type of display devices. The LCD device generally includes two polarizers at the top and the bottom of a liquid crystal layer to adjust the amount of light transmitted therethrough. The two polarizers interact with the liquid crystal layer and thus serve the function of a shutter for controlling the amount of light transmitted through the LCD device.

Since the LCD device does not emit light itself, the LCD device may further include an additional light source. A white light source is generally used as the light source, and desired colors are obtained by filtering white light from the white light source through color filters. However, in the case of an LCD device using color filters, a side gamma curve may differ from a front gamma curve. To improve such a side visibility defect, attempts have been made to divide each pixel electrode into several sub-pixel electrodes. However, this approach not only complicates the structure of an LCD device so as to increase the manufacturing cost of an LCD device, but also has disadvantages in terms of luminance. Thus, there remains a need for an improved LCD device.

SUMMARY

Quantum dot particles may be used, instead of color filters, to improve side visibility in a display device. Quantum dot particles receive light of a particular wavelength and emit light having a different wavelength from that of the received light. Light emitted from quantum dot particles is scattered and may thus improve the side visibility of an LCD device.

Quantum dot particles not only scatter light, but also change the polarization state of light. Thus, in a LCD device, an upper polarizer may be provided between a layer of quantum dot particles and a liquid crystal layer to control transmittance. However, the presence of the upper polarizer increases the distance between the liquid crystal layer and the quantum dot particles and may thus cause a parallax mixing defect, which is a phenomenon in which light from one pixel leaks to a neighboring pixel.

Exemplary embodiments of the present disclosure provide a display device capable of improving side visibility and reducing mixing defects.

According to an exemplary embodiment of the present disclosure, a display device is provided. The display device includes, a plurality of pixels, a first substrate including a pixel electrode disposed in a pixel of the plurality of pixels; a second substrate facing the first substrate, the second substrate including a color adjusting pattern, which is disposed in the pixel of the plurality of pixels, and a common electrode, which is disposed on the color adjusting pattern; and a liquid crystal layer interposed between the first substrate and the second substrate and including a liquid crystal and a dichroic dye, wherein the plurality of pixels include a first-color pixel, which is configured to display a first color, and a second-color pixel, which is configured to display a second color different from the first color; and the color adjusting pattern includes a first color adjusting pattern, which is disposed in the first-color pixel, and a second color adjusting pattern, which is disposed in the second-color pixel, and the first color adjusting panel is configured to convert a wavelength of incident light into a first color, and the second color adjusting pattern is configured to convert the wavelength of incident light into a second-color wavelength.

The pixels may further include a third-color pixel, which is configured to displays a third color different from the first color and the second color, and the color adjusting pattern further includes a third color adjusting pattern, which is disposed in the third-color pixel and is configured to convert the wavelength of incident light into a third-color wavelength.

Also, the display device may further include a light source assembly disposed on a surface of the first substrate, and including a blue light source.

The third color adjusting pattern may further include light scattering particles.

The dichroic dye may include at least one of anthraquinone dye selected from structures 1 to 4 in Formula 1:

Formula 1

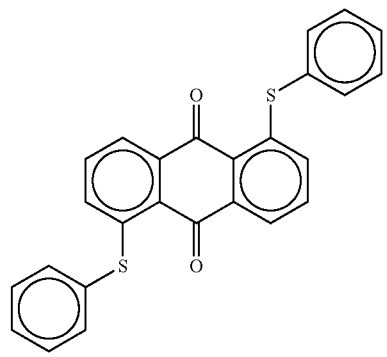

1

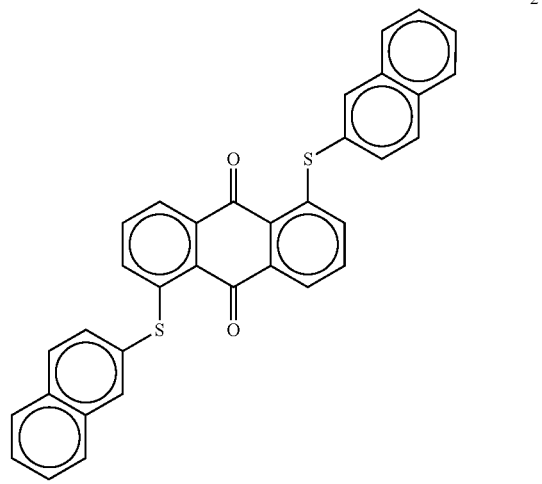

2

-continued

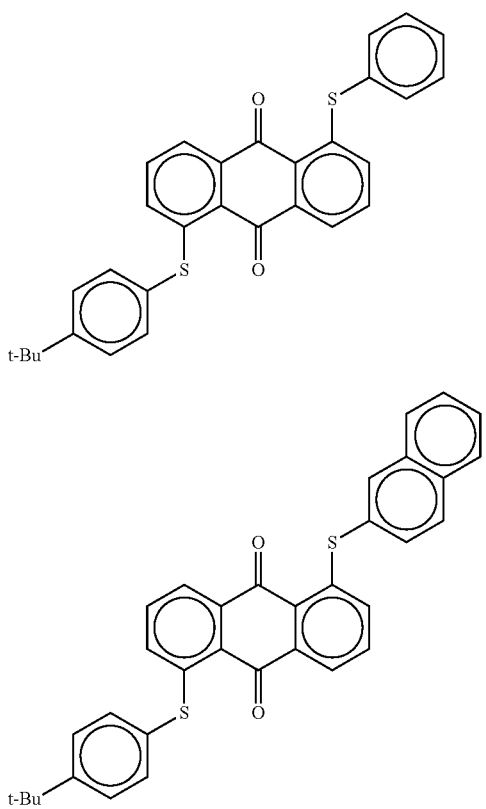

The first substrate may further include a first alignment layer aligned in a first direction; the second substrate may further include a second alignment layer aligned in a second direction different from the first direction; and the liquid crystal layer may be disposed between the first alignment layer and the second alignment layer.

Wherein the liquid crystal may comprise a chiral dopant and the liquid crystal is a twisted nematic (TN) liquid crystal, which may be twisted and horizontally aligned between the first alignment layer and the second alignment layer.

Also, the liquid crystal layer may have a u value of about a square root (√) of 15 (e.g. √15), in which u is determined by the following Equation 11:

$$u = \frac{2\Delta nd}{\lambda} \qquad \text{Equation 11}$$

where d denotes the cell gap of the liquid crystal layer, $\Delta n$ denotes the refractive index anisotropy of the liquid crystal, and $\lambda$ denotes the wavelength of light incident upon the liquid crystal layer from the blue light source.

The first substrate may further include a first alignment layer, the second substrate may further include a second alignment layer having a same alignment direction as the first alignment layer, and the liquid crystal may be horizontally aligned on the first alignment layer and on the second alignment layer.

Also, the first substrate may further include a first alignment layer, the second substrate may further include a second alignment layer having a same alignment direction as the first alignment layer, and the liquid crystal may be vertically aligned on the first alignment layer and on the second alignment layer.

Each of the pixel electrodes may include branches and slits disposed between the branches, and a direction in which the branches extend may be the same as a direction in which the slits extend.

The display device may further include a polarizing member disposed on a surface of the first substrate. The polarizing member may not be interposed between the liquid crystal layer and the color adjusting pattern.

According to another exemplary embodiment of the present disclosure, a display device includes, a plurality of pixels; a first substrate including a pixel electrode disposed in a pixel of the plurality of pixels, and a common electrode, which is electrically insulated from the pixel electrodes; a second substrate facing the first substrate and including a color adjusting pattern disposed in a pixel of the plurality of pixels; and a liquid crystal layer interposed between the first substrate and the second substrate and including liquid crystal and a dichroic dye, wherein, the pixels include a first-color pixel, which displays a first color, and a second-color pixel, which displays a second color that is different from the first color the color adjusting pattern includes a first color adjusting pattern, which is disposed in the first-color pixel, and a second color adjusting pattern, which is disposed in the second-color pixel, and the first color adjusting pattern is configured to convert a wavelength of incident light into a first color wavelength, and the second color adjusting pattern is configured to convert the wavelength of incident light into a second-color wavelength.

The plurality of pixels may further include a third-color pixel, which is configured to display a third color different from the first color and the second color, and the color adjusting pattern may further include a third color adjusting pattern, which is disposed in the third-color pixel and is configured to convert the wavelength of incident light into a third-color wavelength.

The display device may further comprise a light source assembly disposed on a surface of the first substrate and including a blue light source.

The third color adjusting pattern may further include light scattering particles.

Also, the dichroic dye may comprise at least one anthraquinone dye selected from structures 1 to 4 of Formula 1:

Formula 1

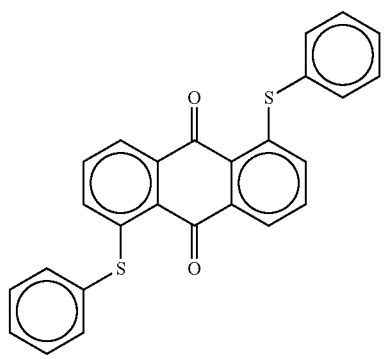

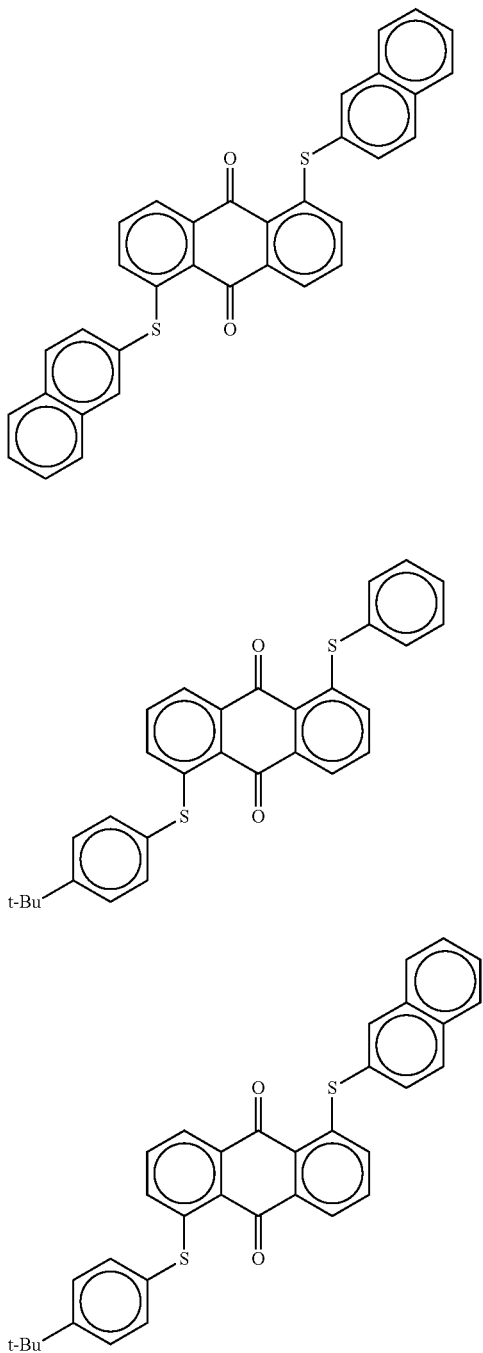

The first substrate may further include a first alignment layer aligned in a first direction, the second substrate may further include a second alignment layer aligned in a second direction different from the first direction, and the liquid crystal layer may be disposed between the first alignment layer and the second alignment layer.

The liquid crystal may comprise a chiral dopant and the liquid crystal is a TN liquid crystal, which may be twisted and horizontally aligned between the first alignment layer and the second alignment layer.

The liquid crystal layer may have a u value of about √15, wherein u is determined by following Equation 11:

$$u = \frac{2\Delta nd}{\lambda} \quad \text{Equation 11}$$

where d denotes the cell gap of the liquid crystal layer, Δn denotes the refractive index anisotropy of the liquid crystal, and λ denotes the wavelength of light incident upon the liquid crystal layer from the blue light source.

The first substrate may further include an interlayer dielectric layer interposed between the pixel electrode and the common electrode.

The pixel electrode may include branches and slits disposed between the branches, and a direction in which the branches extend and a direction in which the slits extend may be the same as the second direction.

The pixel electrodes and the common electrode may be disposed in the same layer and are spaced from each other.

The pixel electrode and the common electrode may face each other with the slits of each of the pixel electrodes interposed therebetween, and a direction in which the slits of each of the pixel electrodes extend is the same as the second direction, and a direction in which the pixel electrode and the common electrode extend is the same as the second direction.

The display device may further comprise a polarizing member disposed on a surface of the first substrate. A polarizing member may not be interposed between the liquid crystal layer and the color adjusting pattern.

According to the exemplary embodiments, side visibility may be improved, and mixing defects may be reduced. Also, the thickness and the manufacturing cost of an LCD device may be reduced by omitting at least one polarizer.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below. Other features and aspects will be apparent from the following detailed description, the drawings, and the claims.

BRIEF DESCRIPTION OF THE DRAWINGS

The above and other aspects, advantages and features of this disclosure will become apparent by describing in further detail exemplary embodiments thereof with reference to the accompanying drawings in which.

DETAILED DESCRIPTION

Figure 1:
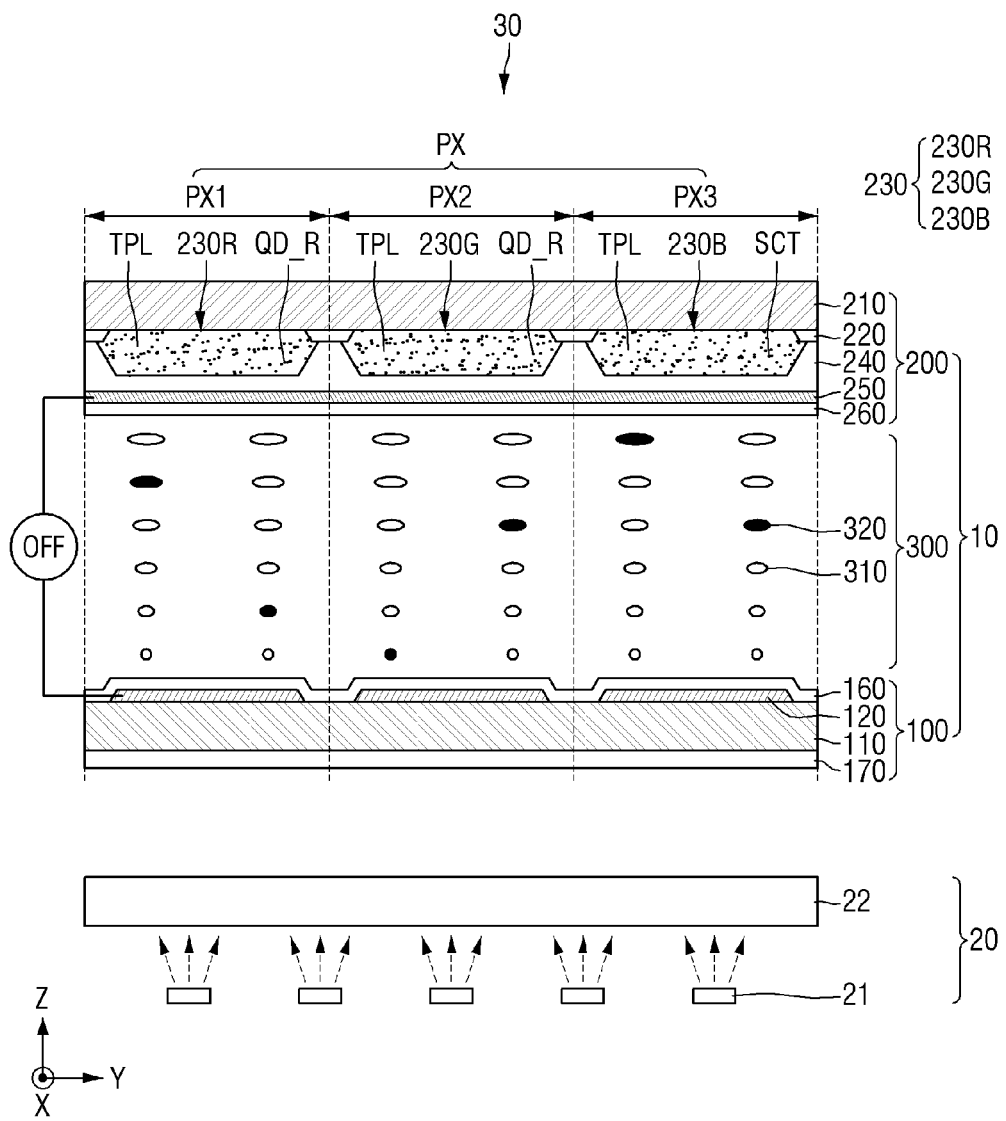
FIG. 1 is a cross-sectional view of a display device according to an exemplary embodiment.

Features of the inventive concept and methods of accomplishing the same may be understood more readily by reference to the following detailed description of preferred embodiments and the accompanying drawings.

The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the inventive concept will only be defined by the appended claims. Like reference numerals refer to like elements throughout.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "bottom," "below," "lower," "under," "above," "upper," "top" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the present invention will be described in detail with reference to the attached drawings.

FIG. 1 is a cross-sectional view of a display device according to an exemplary embodiment.

Referring to FIG. 1, a display device 30 includes a display panel 10 and a light source assembly 20, which is disposed on one side of the display panel 10.

The display panel 10 includes a plurality of pixels PX. The pixels PX may be arranged in a matrix form. The pixels PX may be divided color pixels displaying different colors from one another. For example, the pixels PX may include a red color pixel PX1, a green color pixel PX2, and a blue color pixel PX3. The red color pixel PX1, the green color pixel PX2, and the blue color pixel PX3 may be alternately arranged.

The display panel 10 includes a first substrate 100, a second substrate 200, which faces the first substrate 100, and a liquid crystal layer 300, which is interposed between the first substrate 100 and the second substrate 200. The light source assembly 20 is disposed on an outer side of the first substrate 100 to be adjacent to the first substrate 100. A screen (not shown) may be displayed on an outer side of the second substrate 200, for example, in a direction Z. In the following description, a direction Z may be defined as a first side, and a direction −Z, which is opposite to the direction Z, may be defined as a second side.

The first substrate 100 may include a first insulating substrate 110, a plurality of pixel electrodes 120, which are disposed on the first insulating substrate 110, and a first alignment layer 160, which covers each of the pixel electrodes 120.

The first insulating substrate 110 may be formed of a transparent material such as glass or a transparent plastic material.

The pixel electrodes 120 are disposed on a first side of the first insulating substrate 110. The pixel electrodes 120 may be disposed in the pixels PX, respectively. For example, a single pixel electrode is disposed in a single pixel.

The pixel electrodes 120, which are disposed in the pixels PX, may be physically and electrically isolated from one another. The pixel electrodes 120 may be formed of a transparent conductive material. For example, the pixel electrodes 120 may be formed of at least one material selected from indium tin oxide (ITO), indium zinc oxide (IZO), and zinc oxide (ZO), but the present disclosure is not limited thereto.

Although not specifically illustrated, wiring, electrodes, switching devices, and insulating layers, all of which transmit data voltages to the pixel electrodes 120, may be disposed between the first insulating substrate 110 and the pixel electrodes 120. Various structures regarding the arrangement of the wiring, the electrodes, the switching devices, and the insulating layers between the first insulating substrate 110 and the pixel electrodes 120 are already well known in the art to which the present disclosure pertains, and thus, a detailed description thereof will be omitted.

The first alignment layer 160 is disposed on a first side of the pixel electrodes 120. The first alignment layer 160 is disposed to cover the pixel electrodes 120. The first alignment layer 160 is disposed to be in contact with the liquid crystal layer 300. The first alignment layer 160 may comprise at least one material such as polyamic acid, polysiloxane, or polyimide, but is not limited thereto, and may be any suitable material which may be used to form a liquid crystal alignment layer. The alignment direction of the first alignment layer 160 may be a first direction X. The first alignment layer 160 may be rubbed in the first direction X. The first alignment layer 160 may be a photo-alignment layer.

The second substrate 200 includes: a second insulating substrate 210; light-shielding members 220 and color adjusting patterns 230, which are disposed on the second insulating substrate 210; a planarization layer 240, which is disposed on the light-shielding member 220 and on the color adjusting patterns 230; a common electrode 250, which is disposed on the planarization layer 240; and a second alignment layer 260, which is disposed on the common electrode 250.

The second insulating substrate 210, similar to the first insulating substrate 110, may be formed of a transparent material such as glass or a transparent plastic material.

The light-shielding members 220 are disposed on a surface of a second side of the second insulating substrate 210. The light-shielding members 220 are disposed along the boundaries among the pixels PX. The light-shielding members 220 define openings, which at least partially expose the pixels PX. The light-shielding members 220 may be formed in a matrix form.

The light-shielding members 220 may be formed of a material capable of blocking the transmission of light by absorbing or reflecting light within a particular wavelength range. For example, the light-shielding members 220 may be formed of a material capable of blocking the transmission of light having a wavelength in the visible range. In another example, the light-source assembly 20 may provide blue light, and the light-shielding members 220 may be formed of a material capable of blocking the transmission of blue light. In this example, the light-shielding members 220 may allow the transmission of some light in a non-blue, visible wavelength range.

The color adjusting patterns 230 are disposed on a surface of the second side of the second insulating substrate 210. The color adjusting patterns 230 may be disposed to fill the spaces of the second insulating substrate 210 which are not occupied by the light-shielding members 220.

The color adjusting patterns 230 may maintain or convert the color of light transmitted therethrough. If the light provided by the light source assembly 20 has a blue wavelength, a first color adjusting pattern 230R, which is disposed in the red color pixel PX1, and a second color adjusting pattern 230G, which is disposed in the green color pixel PX2, may act as wavelength-converting layers, and a third color adjusting pattern 230B, which is disposed in the blue color pixel PX3, may be a wavelength-maintaining layer.

More specifically, the first color adjusting pattern 230R and the second color adjusting pattern 230G may include quantum dots QD_R and quantum dots QD_G, respectively, each of which are wavelength-converting materials. Each of the quantum dots QD_R and the quantum dots QD_G is a spherical semiconductor nanomaterial having a size of several to hundreds of nanometers and may include a core, which is formed of a material with a small bandgap, and a shell, which is disposed to surround the core. The quantum dots QD_R and the quantum dots QD_G, unlike materials in a bulk state, have a discontinuous bandgap energy due to the quantum confinement effect. If the quantum dots QD_R and the quantum dots QD_G absorb light, the energy level inside each of the quantum dots QD_R and the quantum dots QD_G may be lowered, and thus, the quantum dots QD_R and the quantum dots QD_G may emit light having a different wavelength from that of light incident thereupon. The light emitted by the quantum dots QD_R and the quantum dots QD_G may be scattered in various directions regardless of the angle of incidence of the light incident upon the quantum dots QD_R and the quantum dots QD_G.

For example, if blue light is incident upon the quantum dots QD_R and the quantum dots QD_G, the quantum dots QD_R and the quantum dots QD_G may convert the wavelength of the blue light and may thus emit, for example, green or red light. As the particle size of the quantum dots QD_R and the quantum dots QD_G increases, the energy gap between the energy levels becomes narrower, and thus, the quantum dots QD_R and the quantum dots QD_G may emit light having a relatively lower energy wavelength, i.e., a longer wavelength. Accordingly, quantum dots of a larger particle size (i.e., the quantum dots QD_R) may be disposed in the red color pixel PX1 rather than in the green color pixel PX2. That is, the average particle size of the quantum dots QD_R in the first color adjusting pattern 230R may be larger than the average size of the quantum dots QD_G in the second color adjusting pattern 230G.

The quantum dots QD_R and the quantum dots QD_G may include at least one of a Group 2 compound semiconductor, a Group 3 compound semiconductor, a Group 4 compound semiconductor, and a Group 5 compound semiconductor. For example, the core nanocrystals of the quantum dots QD_R and the quantum dots QD_G may include at least one of CdSe, CdTe, CdS, ZnSe, ZnTe, ZnS, ZnO, InP, GaP, InN, InGaP, InGaN, HgTe, and HgS. For example, the cell nanocrystals of the quantum dots QD_R and the quantum dots QD_G may include at least one of CuZnS, CdSe, CdTe, CdS, ZnSe, ZnTe, ZnS, GaP, GaN, HgTe, and HgS.

The quantum dots QD_R of the first color adjusting pattern 230R may be formed of the same material as the quantum dots QD_G of the second color adjusting pattern 230G. Alternatively, the quantum dots QD_R of the first color adjusting pattern 230R may be formed of a different material from the quantum dots QD_G of the second color adjusting pattern 230G.

Each of the first color adjusting pattern 230R and the second color adjusting pattern 230G may further include a light-transmitting material layer TPL in addition to the quantum dots QD_R or QD_G. The light-transmitting material layer TPL transmits light therethrough without changing the wavelength of the light. The quantum dots QD_R or QD_G may be dispersed in the light-transmitting material layer TPL. The light-transmitting material layer TPL may be formed of an organic material, but the present disclosure is not limited thereto.

The third color adjusting pattern 230B may also include the light-transmitting material layer TPL. If the light provided by the light source assembly 20 is blue light, the light-transmitting material layer TPL may transmit the blue light therethrough without changing the wavelength of the blue light.

The third color adjusting pattern 230B may further include light scattering particles SCT, which are dispersed in the light-transmitting material layer TPL. The quantum dots QD_R or QD_G of the first or second color adjusting patterns 230R and 230G, which are wavelength-converting layers, may emit light in directions that are irrelevant to the angle of incidence of light incident thereupon. That is, the red color pixel PX1 and the green color pixel PX2 may emit light which is scattered in various directions. To achieve similar emission properties to those of the red color pixel PX1 and the green color pixel PX3, the blue color pixel PX3 may include the light scattering particles SCT. The light scattering particles SCT may be formed of a material having a different refractive index from the light-transmitting material layer TPL. The light scattering particles SCT may be hollow particles.

At least one of organic particles, inorganic particles, and organic-inorganic hybrid particles may be used as the light scattering particles SCT. Examples of the organic particles include at least one of silicon resin particles, acrylic resin particles (such as polymethyl methacrylate (PMMA) particles), nylon resin particles, styrene resin particles, polyethylene particles, urethane resin particles, and benzoguanamine particles. Examples of the inorganic particles include at least one of diamond, titanium oxide, zirconium oxide, lead oxide, lead carbonate, zinc oxide, zinc sulfide, antimony oxide, silicon oxide, and aluminum oxide.

In some exemplary embodiments, the first color adjusting pattern 230R and/or the second color adjusting pattern 230G may also include the light scattering particles SCT.

As described above, the first color adjusting pattern 230R and the second color adjusting pattern 230G may scatter light due to the presence of the quantum dots QD_R and the quantum dots QD_G, and the third color adjusting pattern 230B may scatter light due to the presence of the light scattering particles SCT. Thus, a problem in which a side gamma curve differs from a front gamma curve may be improved. Accordingly, additional structures for improving side visibility at the level of the pixel electrodes 120 are unnecessary. As an example of a structure for improving side visibility, each pixel electrode may be divided into a high sub-pixel electrode and a low sub-pixel electrode, and complicated additional wiring and electrodes may be included to separately drive the high and low sub-pixel electrodes. On the other hand, in the present exemplary embodiment, a simple one-pixel electrode structure is employed. Thus, the manufacture of the display device 30 may be simplified, and problems such as a decrease in the aperture ratio that may be caused by the presence of additional wiring may be addressed.

The first color adjusting pattern 230R, the second color adjusting pattern 230G, and the third color adjusting pattern 230B may have the same thickness, but the present disclosure is not limited thereto.

The planarization layer 240 may be disposed on a surface of a second side of the light-shielding members 220 and the color adjusting patterns 230. The planarization layer 240 may be formed to cover the entire light-shielding members 220 and the entire color adjusting patterns 230. The planarization layer 240 may be formed of an organic material. In some exemplary embodiments, the planarization layer 240 may not be present.

The common electrode 250 may be disposed on surface of a second side of the planarization layer 240. The common electrode 250 may be disposed to cover the entire planarization layer 240. The common electrode 250 may be formed as a single continuous layer without regard to the distinction between the pixels PX. The common electrode 250 may be formed of a transparent conductive material. For example, the common electrode 250 may include at least one of ITO, IZO, and IZO, but the present disclosure is not limited thereto.

The second alignment layer 260 may be disposed on a surface of a second side of the common electrode 250. The second alignment layer 260 may be disposed to cover the common electrode 250. The second alignment layer 260 is disposed to be in contact with the liquid crystal layer 300. The second alignment layer 260 may comprise at least one material such as polyamic acid, polysiloxane, or polyimide that is commonly used to form a liquid crystal alignment layer. The second alignment layer 260 may have a different alignment direction from the first alignment layer 160, and the alignment direction of the second alignment layer 260 may be a second direction Y. The second alignment layer 260 may be rubbed in the second direction Y. The crossing angle between the first direction X and the second direction Y may be 90°, but the present disclosure is not limited thereto. The second alignment layer 260 may be a photo-alignment layer.

The liquid crystal layer 300 is interposed between the first alignment layer 160 of the first substrate 100 and the second alignment layer 260 of the second substrate 200. The liquid crystal layer 300 may include a liquid crystal 310 and a dichroic dye 320.

Twisted nematic (TN) liquid crystal including a chiral dopant may be used as the liquid crystal 310. The TN liquid crystal 310 may have positive dielectric anisotropy. The TN liquid crystal 310 may be horizontally aligned on the first alignment layer 160 and the second alignment layer 260. The TN liquid crystal 310 may be aligned on the first alignment layer 160 such that the long axis of the TN liquid crystal is oriented along the first direction X (i.e., aligned in the first direction X), and may be aligned on the second alignment layer 260 such that the long axis of the TN liquid crystal is oriented along the second direction Y (i.e., aligned in the second direction Y). The TN liquid crystal 310 may be aligned between the first alignment layer 160 and the second alignment layer 260 such that the long axis of the TN liquid crystal is gradually twisted from the first direction X to the second direction Y along a thickness direction Z.

The dichroic dye 320 is a guest material mixed in a host material, i.e., the liquid crystal 310. The dichroic dye 320 may be uniformly mixed in the liquid crystal 310. The dichroic dye 320 absorbs light of a particular wavelength. The dichroic dye 320 may include at least one selected from an azo dye, an anthraquinone dye, a coumarin dye, a perylene dye, a merocyanine dye, an azomethine dye, a phthaloperylene dye, an indigo dye, a dioxadine dye, a polythiophene dye, and a phenoxazine dye.

In a case in which the light source assembly 20 provides blue light, a yellow dye capable of absorbing blue light may be used as the dichroic dye 320. For example, an anthraquinone dye may be used as the dichroic dye 320 because of its high reliability and stability. Also, an anthraquinone dye has a relatively simple structure, may be easily mixed with the liquid crystal 310, and may thus simplify the manufacture of the display device 30.

The anthraquinone dye may be at least one selected from structures 1 to 4 of Formula 1:

Formula 1

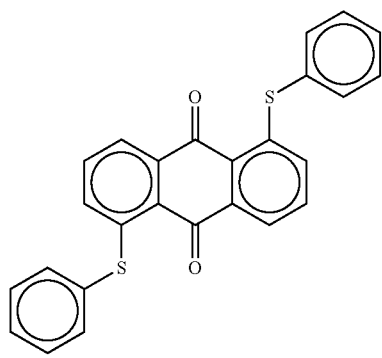

1

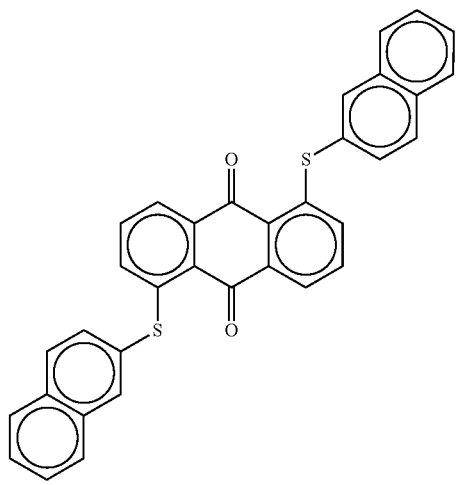

2

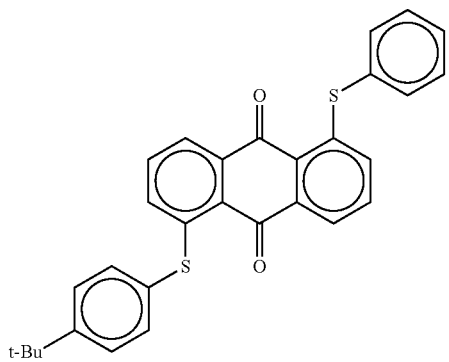

3

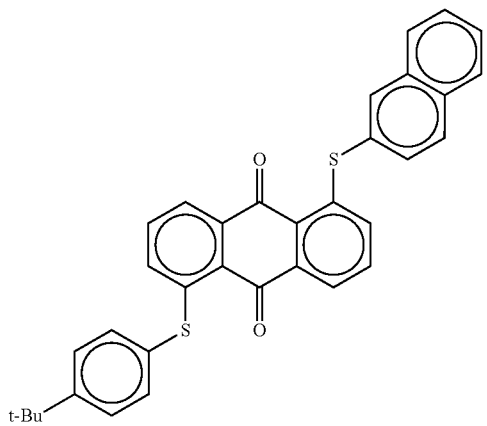

4

In some exemplary embodiments, the liquid crystal layer 300 may further include a fluorescent material in addition to the dichroic dye 320. A material having a structure represented by Formula 2 may be used as the fluorescent material:

Formula 2

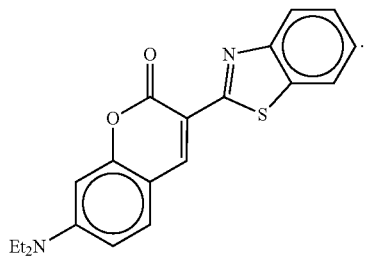

An appropriate concentration of the dichroic dye 320 mixed in the liquid crystal 310 may vary depending on the absorption capability of the dichroic dye 320. For example, the dichroic dye 320 may be mixed in the liquid crystal 310 to a concentration of about 0.1 weight percent (wt %) to about 15 wt %, based on the total weight of the liquid crystal 310 and the dichroic dye 320.

A polarizing member 170 is disposed between the light source assembly 20 and the display panel 10. That is, the polarizing member 170 is disposed on a surface of a second side of the first substrate 100. The polarizing member 170 controls the polarization of light incident upon the first substrate 100. The polarizing member 170 may be an absorptive polarizing member. The polarizing member 170 may be attached on a surface of a second side of the first insulating substrate 110 of the first substrate 100 via an adhesive layer. The polarization direction of the polarizing member 170 may coincide with the alignment direction of the first alignment layer 170, i.e., the first direction X.

In the present exemplary embodiment, the polarizing member 170 is disposed between the light source assembly 20 and the display panel 10 to display an image. A polarizing member may be not be present at a surface of a first side of the liquid crystal layer 300 because the dichroic dye 320 in the liquid crystal layer 300 directly absorbs light and thus controls light transmittance. Thus, a polarizing member may be omitted between the liquid crystal layer 300 and the layer including the color adjusting patterns 230. Also, the polarizing member may be omitted at a surface of a first side of the second substrate 200.

By omitting some polarizing members from the display panel, the thickness of the display panel 10 and the manufacturing cost of the display device 30 may be reduced. Also, by omitting a polarizing member between the liquid crystal layer 300 and the layer including the color adjusting patterns 230, the distance between the liquid crystal layer 300 and the layer of the color adjusting patterns 230 may be reduced by as much as the thickness of the polarizing member, and thus, a parallax mixing defect, which is a phenomenon in which light from one pixel leaks to a neighboring pixel, may be prevented.

The light source assembly 20 includes a light source 21 and an optical member 22. A light-emitting diode (LED) light source, an organic LED (OLED) light source, or a fluorescent lamp may be used as the light source 21. The light source 21 may emit light of a particular wavelength. For example, a blue light source may be used as the light source 21.

Light emitted from the light source 21 may be provided to the display panel 10 via the optical member 22. The optical member 22 improves the quality of light provided to the display panel 10. The optical member 22 may include at least one of a diffusion film, a diffusion plate, a prism film, a microlens array, a reflective polarization film, and a protective film. In a case in which the light source 21 is disposed on a side of the display device 30, the optical member 22 may further include a light guide plate. The arrangement of the light source 21 and the optical member 22 is known in the field to which the present disclosure pertains, and thus, a detailed description thereof will be omitted.

In some exemplary embodiments, the light source assembly 20 may provide ultraviolet (UV) light instead of blue light. In these exemplary embodiments, the third color adjusting pattern 230B may also include quantum dots (not illustrated) as a wavelength converting material. More specifically, the quantum dots QD_R of the first color adjusting pattern 230R may convert UV light into red light, the quantum dots QD_G of the second color adjusting pattern 230G may convert UV light into green light, and the quantum dots of the third color adjusting pattern 230B may convert UV light into blue light. In these exemplary embodiments, a UV light absorbing material may be used as the dichroic dye 320 of the liquid crystal layer 300, and the light scattering particles SCT of the third color adjusting patterns 230B may be omitted.

The operation of the display device 30 will hereinafter be described.

Figure 2:
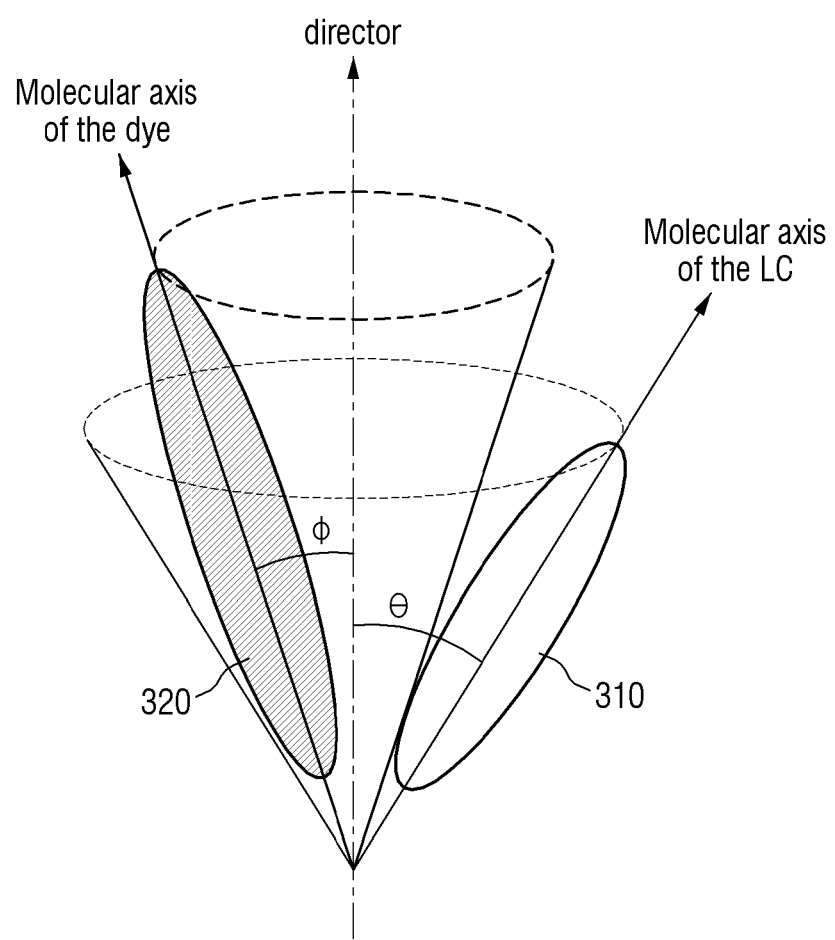
FIG. 2 is an illustration explaining the relationship between liquid crystal molecules and a transition moment of a dichroic dye.

FIG. 2 is a schematic view illustrating the relationship between liquid crystal molecules and a transition moment of a dichroic dye.

Referring to FIG. 2, a variety of physical properties of the liquid crystal layer 300 may vary depending on the liquid crystal 310, the dichroic dye 320, and the combination thereof. For example, the color of the liquid crystal layer 300 may be determined by the dichroic dye 320, and the dielectric anisotropy, the elastic constant, and the refractive index of the liquid crystal layer 300 may be determined by the liquid crystal 310.

The directors of the molecules of the dichroic dye 320 generally coincide with the directors of the liquid crystal 310. However, the direction of the long axes of the liquid crystal 310 and the direction of the long axes of the molecules of the dichroic dye 320 may differ from each other due to thermal fluctuation. The influence of thermal fluctuation on the dichroic dye 320 or the liquid crystal 310 may vary depending on the length and the geometric shape of the molecules of the dichroic dye 320 or the liquid crystal 310.

When the angle that the liquid crystal 310 forms with a given director is θ and the angle that the dichroic dye 320 forms with the given director is φ, an order parameter $S_L$ of the liquid crystal 310, determined by the distribution of the long axes of the liquid crystal 310, and an order parameter $S_D$ of the dichroic dye 320, determined by the distribution of the long axes of the molecules of the dichroic dye 320, may be represented by Equation 1:

$$S_L = \frac{\langle 3\cos^2\theta - 1\rangle}{2}, S_D = \frac{\langle 3\cos^2\varphi - 1\rangle}{2} \quad \text{Equation 1}$$

where $\langle\cos^2\theta\rangle$ is the average of $\cos^2\theta$.

The difference between the angle θ and the angle φ is one of the reasons that the order parameter $S_L$ of the liquid crystal 310 and the order parameter $S_D$ of the dichroic dye 320 differ from each other. One of the parameters that determine the effectiveness of the dichroic dye 320 is a transition moment order parameter of absorbance $S_T$ of the dichroic dye 320. The absorbance $S_T$ of dichroic dye 320 is related to the color and the absorbance rate of the dichroic dye 320. The value of absorbance $S_T$ may vary depending on the order parameter $S_D$ of the long axes of the dichroic dye 320. When the transition moment of the dichroic dye 320 forms an angle $\theta_T$ with the directors of the liquid crystal 310, the absorbance $S_T$ may be determined by Equation 2:

$$S_T = \frac{\langle 3\cos^2\theta_T - 1\rangle}{2}. \quad \text{Equation 2}$$

When the direction of the transition moment T of the dichroic dye 320 has an angle β with respect to the long axes of the molecules of the dichroic dye 320, incident light absorbance A for polarized light having an electric field vector P form an angle ψ with the n directors may be represented by Equation 3:

$$A(\beta, \psi) = kcd\left[\left(\frac{S_D}{2}\right)\sin^2\beta + \left(\frac{1-S_D}{3}\right) + \left(\frac{S_D}{2}\right)(2 - 3\sin^2\beta)\cos^2\psi\right]$$

Equation 3 where k denotes the amplitude of the transition moment T, c denotes the concentration of the dichroic dye 320, and d denotes the thickness of the liquid crystal layer 300, i.e., the cell gap of the liquid crystal layer 300. According to Equation 3, the incident light absorbance A reaches its maximum when ψ=0° and reaches its minimum when ψ=90°.

A dichroic ratio D may be represented as the ratio of incident light absorbance when ψ=0° and when ψ=90°, as indicated by Equation 4:

$$D = \frac{A_\parallel}{A_\perp} = \frac{A(\beta; \psi = 0°)}{A(\beta; \psi = 90°)} = \frac{2 + 4S_D - 6S_D \sin^2\beta}{2 - 2S_D + 3S_D \sin^2\beta}.$$

Equation 4

The order parameter $S_T$ of the transition moment T may be experimentally determined, as indicated by Equation 5:

$$S_T = \frac{A_\parallel - A_\perp}{A_\parallel + 2A_\perp} = \frac{D-1}{D+2}.$$

Equation 5

Based on Equations 4 and 5, the following Equation 6 may be established:

$$S_T = \frac{S_D(2 - 3\sin^2\beta)}{2}.$$

Equation 6

Thus it can be seen that the dichroic dye 320 follows the Beer-Lambert law. When the absorbance coefficient of the dichroic dye 320 in an anisotropic medium is α, the following Equations 7 and 8 may be established:

$$T_\parallel = e^{-(2S_D + 1)\alpha cd}$$

Equation 7

; and $$T_\perp = e^{-(1 + S_D)\alpha cd}$$

Equation 8 where $T_\parallel$ denotes transmittance for polarized light parallel to the long-axis direction of the dichroic dye 320, i.e., transmittance when the polarization direction of light applied to the liquid crystal layer 300 is parallel to the alignment direction, $T_\perp$ denotes transmittance for polarized light perpendicular to the long-axis direction of the dichroic dye 320, i.e., transmittance when the polarization direction of light applied to the liquid crystal layer 300 is perpendicular to the alignment direction, c denotes the concentration of the dichroic dye 320, d denotes the thickness of the liquid crystal layer 300 (e.g. cell gap thickness), and a denotes the absorbance coefficient of the dichroic dye 320. As is apparent from Equations 7 and 8, transmittance is lower when the polarization direction of the light applied to the liquid crystal layer 300 is parallel to the long-axis direction of the dichroic dye 320 than when the polarization direction of the light applied to the liquid crystal layer 300 is perpendicular to the long-axis direction of the dichroic dye 320.

Referring to FIG. 1 and FIG. 2, if light polarized in the first direction X by the polarizing member 170 is provided to the liquid crystal layer 300 in an initial alignment state in which an electric field has not yet been applied (e.g. electric field is "off") to the liquid crystal layer 300, the angle that the polarization direction of the polarized light forms with the n directors of the molecules of the dichroic dye 320 may become 0°. Since optical rotation occurs along the liquid crystal 310 and the dichroic dye 320, which are both twisted in the thickness direction Z, the angle that the polarization direction of the polarized light forms with the directors of the molecules of the dichroic dye 320 may be maintained at about 0° throughout the thickness direction Z. This corresponds to a case in which the polarization direction of the polarized light is parallel to the alignment direction of the dichroic dye 320, and in this case, a relatively large amount of light is absorbed by the dichroic dye 320 according to Equation 7 such that only a small amount of light may arrive at the color adjusting patterns 230. If the absorbance of the dichroic dye 320 is sufficiently high, the display panel 10 may display a black image without the inclusion of an additional polarizing member at the first side of the liquid crystal layer 300. That is, in the absence of an electric field, the display panel 10 may be in a normally black mode in which a black image is displayed.

Figure 3:
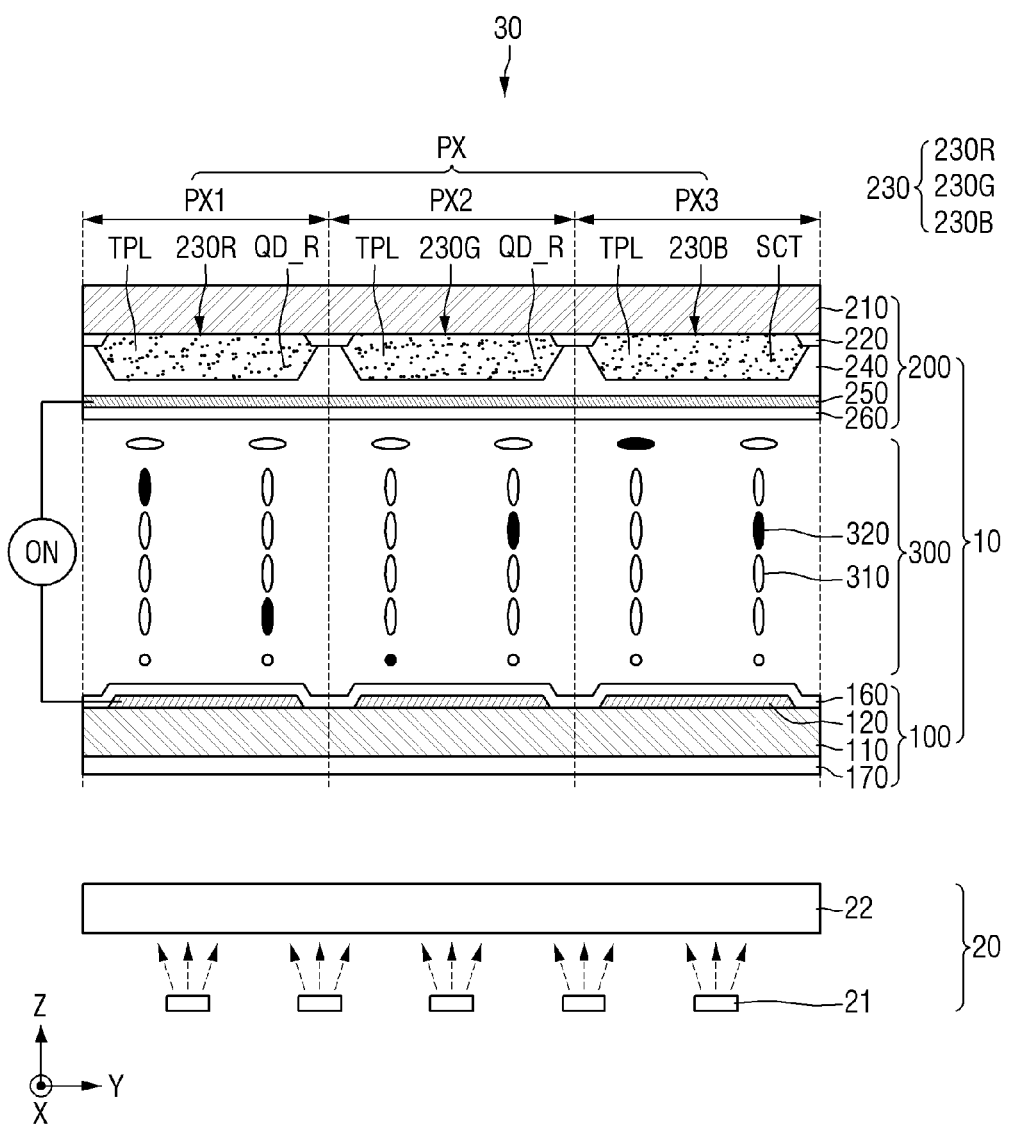
FIG. 3 is a cross-sectional view illustrating the display panel of FIG. in a state in which an electric field is applied to a liquid crystal layer.

FIG. 3 is a cross-sectional view illustrating a state in which an electric field is applied (e.g. electric field is "on") to a liquid crystal layer of the display panel of FIG. 1. Referring to FIG. 3, if different voltages are applied to the pixel electrodes 120 and the common electrode 250 and as a result, a vertical electric field is generated between the pixel electrodes 120 and the common electrode 250, the directors of the liquid crystal 310, which have positive dielectric anisotropy, rotate to be aligned in parallel to the direction of the electric field. As mentioned above, since the directors of the molecules of the dichroic dye 320 coincide with the directors of the liquid crystal 310 in a liquid crystal mixture, the directors of the molecules of the dichroic dye 320 may also rotate to be in aligned parallel to the direction of electric field. Then, if light polarized in the first direction X by the polarizing member 170 is provided to the liquid crystal layer 300, the angle formed by the polarization direction of the polarized light and the directors of the molecules of the dichroic dye 320 may be about 90°. Most of the liquid crystal 310 and the molecules of the dichroic dye 320, except for those in areas that are directly regulated by the alignment force of the first alignment layer 160 and the second alignment layer 260, may have the same angle (e.g., an angle perpendicular to the first substrate 100) throughout the thickness direction Z. Accordingly, no optical rotation occurs along the thickness direction Z, and the angle formed by the polarization direction of the polarized light and the directors of the molecules of the dichroic dye 320 may be maintained at about 90°. This corresponds to a case in which the polarization direction of the polarized light is perpendicular to the alignment direction of the dichroic dye 320 (i.e., the thickness direction Z), and in this case, a relatively small amount of light is absorbed by the dichroic dye 320 according to Equation 8 such that a large amount of light may arrive at the color adjusting patterns 230. Accordingly, the display panel 10 may display a white image without the inclusion of an additional polarizing member at the first side of the liquid crystal layer 300.

An intermediate gray image between a black image and a white image may be displayed by controlling the difference between the voltage applied to the pixel electrodes 120 and the voltage applied to the common electrode 250.

Contrast ratio CR, which is the ratio of maximum luminance to minimum luminance, may be represented as the ratio of the transmittance $T_\perp$, which is the transmittance when the polarization direction of light applied to the liquid crystal layer 300 is perpendicular to the alignment direction of the dichroic dye 320, to the transmittance $T_\parallel$, which is the transmittance when the polarization direction of the light applied to the liquid crystal layer 300 is parallel to the alignment direction of the dichroic dye 320, as indicated by Equation 9:

$$CR = \frac{T_\perp}{T_\parallel} = e^{3S_D \alpha c d} \qquad \text{Equation 9}$$

As is apparent from Equation 9, the higher the absorbance coefficient of the dichroic dye 320 $\alpha$, the concentration of dichroic dye 320 c, the order parameter $S_D$ of the dichroic dye 320, and the thickness of cell gap d, the higher the contrast ratio CR.

The optical properties of the display panel 10 comprising the TN liquid crystal 310 may be calculated using Jones matrices in accordance with the Gooch-Tarry equation. When the TN liquid crystal 310 display a white color, normalized transmittance $T_{TN}$ may be represented by Equation 10:

$$T_{TN} = \frac{1}{2}\left(1 - \frac{\sin^2\left(\frac{\pi}{2}\right)\sqrt{1+u^2}}{1+u^2}\right), \qquad \text{Equation 10}$$

In Equation 10, u is determined by the following Equation 11:

$$u = \frac{2\Delta n d}{\lambda} \qquad \text{Equation 11}$$

where in Equations 10 and 11, d denotes the cell gap of the liquid crystal layer 300, $\Delta n$ denotes the refractive index anisotropy of the liquid crystal 310, and $\lambda$ denotes the wavelength of light incident upon the liquid crystal layer. The normalized transmittance $T_{TN}$ as calculated by Equation 10 is represented in FIG. 4 as a graph.

Figure 4:
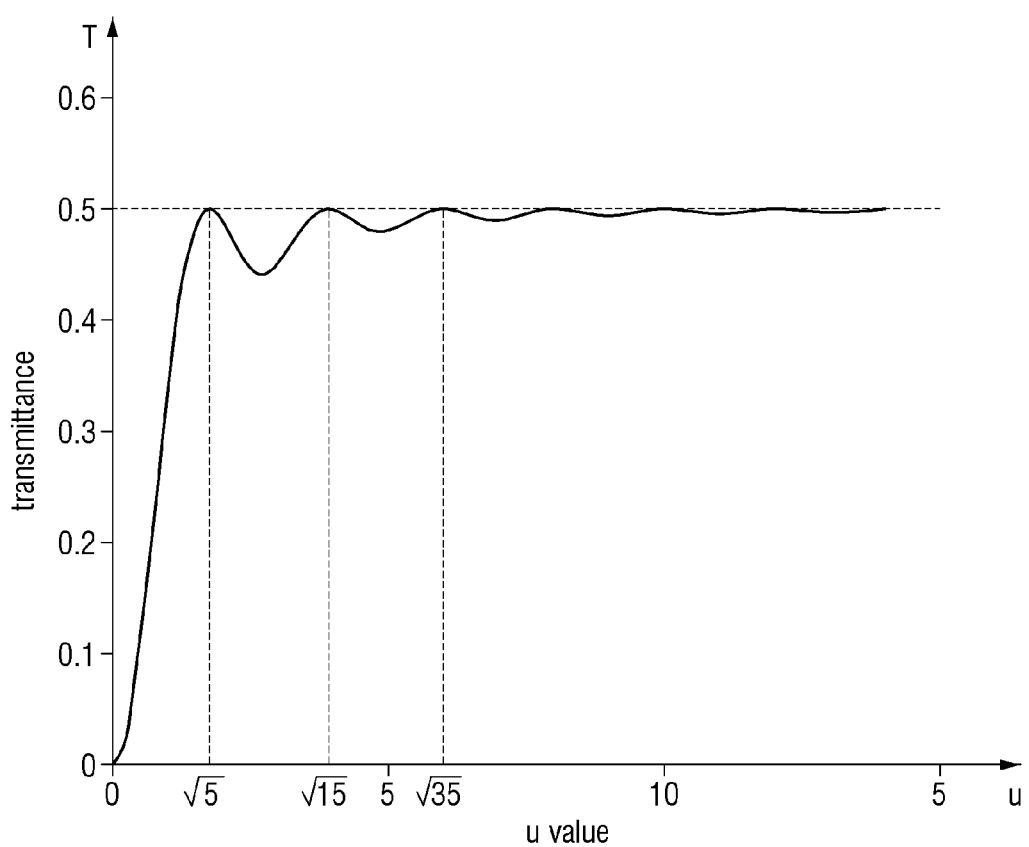
FIG. 4 is a graph of the light transmittance (arbitrary units) versus a u value as defined by Equation 11, which shows the light transmittance properties of a display panel comprising the TN liquid crystal molecules.

FIG. 4 is a graph showing the transmittance properties of a display panel comprising the TN liquid crystal molecules. Referring to FIG. 4, the x axis represents the value of u as defined by Equation 11, and the y axis represents transmittance T. Since the amount of light transmitted through the polarizing member 170 is reduced to 50% already, the transmittance of the display panel 10 comprising the TN liquid crystal 310, i.e., the transmittance T, may become 50% or lower.

Referring to FIG. 4 and Equation 10, as the value of u changes, the transmittance T repeatedly increases and decreases. First maximum of transmittance is obtained when the value of u is about $\sqrt{5}$, the second maximum of transmittance is obtained when the value of u is about $\sqrt{15}$, and the third maximum of transmittance is obtained when the value of u is about $\sqrt{35}$.

According to Equation 10, since the wavelength $\lambda$ of incident light is fixed to a particular wavelength provided by the light source assembly 20, for example, a blue wavelength, the value of u is proportional to the refractive index anisotropy $\Delta n$ and the cell gap d. If the display panel 10 is designed in accordance with the first maximum of transmittance, which corresponds to a smallest "u" value, the display panel 10 may have a small cell gap d. However, according to Equation 9, the smaller the cell gap d, the lower the contrast ratio CR. Thus, to address this, the absorbance coefficient $\alpha$, the concentration c, or the order parameter $S_D$ of the dichroic dye 320 needs to be increased. However, since the absorbance coefficient $\alpha$ and the order parameter $S_D$ of the dichroic dye 320 are substantially difficult to control, it may not be easy to sufficiently compensate for the contrast ratio CR by controlling the absorbance coefficient $\alpha$ and the order parameter $S_D$ of the dichroic dye 320. The concentration c of the dichroic dye 320 is relatively easy to control, but if the concentration c of the dichroic dye 320 is increased in a situation where the cell gap d is relatively small, the solubility and dispersibility of the dichroic dye 320 in a liquid crystal mixture may not be sufficient.

To achieve both a high luminance and a sufficient contrast ratio CR at the same time, the display panel 10 may be designed in accordance with the second maximum of transmittance. If the display panel 10 is designed in accordance with the second maximum of transmittance such that the value of u becomes about $\sqrt{15}$, a sufficiently large cell gap d may be used, and as a result, a sufficient contrast ratio CR may be obtained without excessively increasing the concentration c of the dichroic dye 320.

Figure 5:
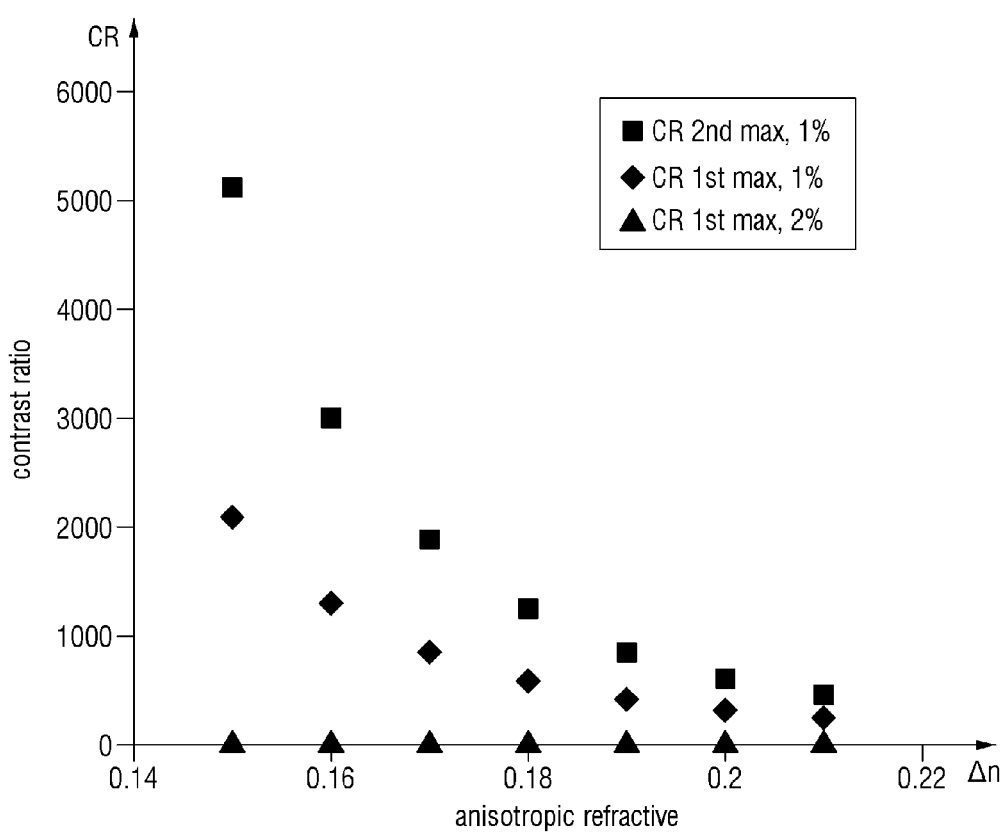
FIG. 5 is a graph of contrast ratio versus refractive index anisotropy, which shows the relationship between refractive index anisotropy, the concentration of a dichroic dye, and contrast ratio.

FIG. 5 is a graph showing the relationship between the refractive index anisotropy, the concentration of a dichroic dye, and the contrast ratio. Referring to FIG. 5, to secure a high contrast ratio CR, it may be more effective to set the value of u in accordance with the second maximum of transmittance rather than increasing the concentration c of the dichroic dye 320.

Other exemplary embodiments of the present disclosure will hereinafter be described.

Figure 6:
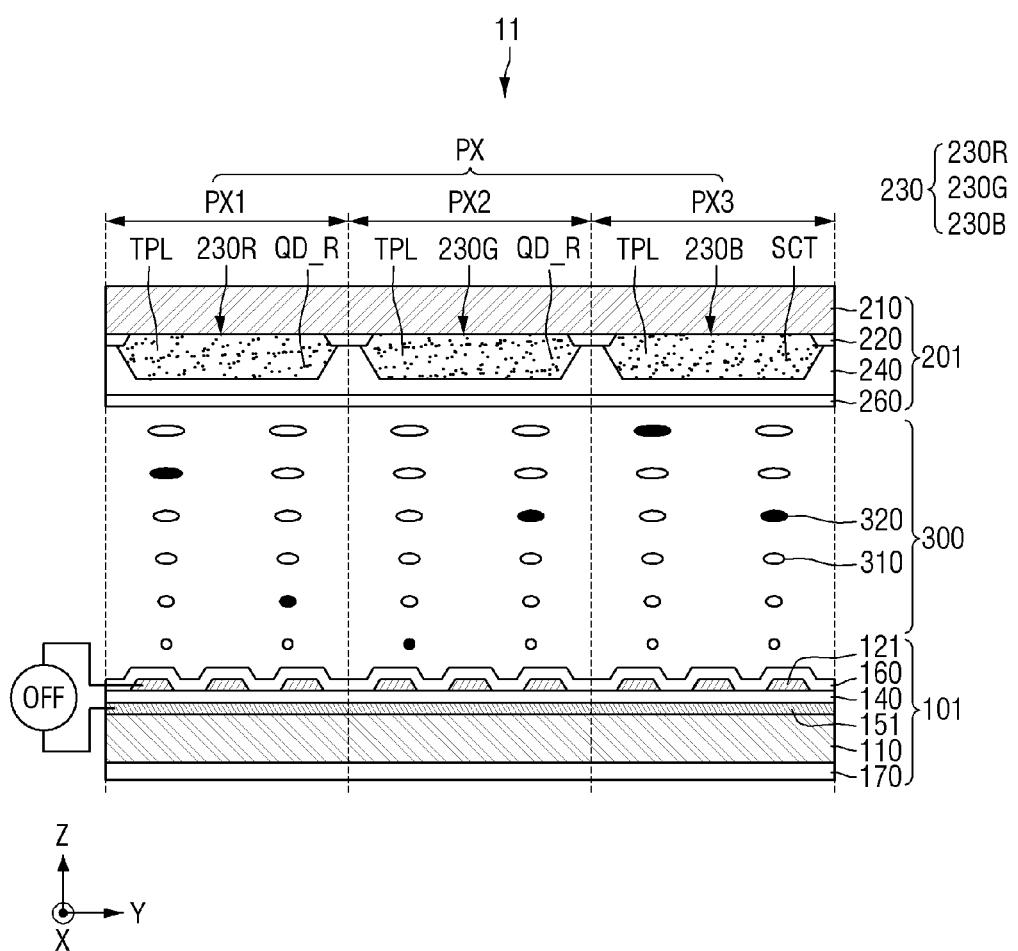
FIG. 6 is a cross-sectional view of a display panel according to another exemplary embodiment.

FIG. 6 is a cross-sectional view of a display panel according to another exemplary embodiment of the present disclosure. Referring to FIG. 6, a display panel 11 according to the present exemplary embodiment differs from the display panel 10 according to the exemplary embodiment of FIG. 1 in that a common electrode 151 is formed on a first substrate 101. That is, FIG. 6 illustrates a Plane-to-Line Switching (PLS)-mode liquid crystal display (LCD) panel.

More specifically, a common electrode 151 is disposed on a surface of a first side of a first insulating substrate 110, an interlayer dielectric layer 140 is disposed on a surface of a first side of the common electrode 151, and a plurality of pixel electrodes 121 are disposed on a surface of a first side of the interlayer dielectric layer 140. In a second substrate 201, a second alignment layer 260 is disposed on a surface of a second side of color adjusting patterns 230 and a planarization layer 240 without a common electrode interposed therebetween.

The common electrode 151 and the interlayer dielectric layer 140 may be disposed to cover the entire surface of the first insulating substrate 110. Each of the pixel electrodes 121 includes branches and slits, with the slits disposed between the branches, and an electric field between the pixel electrodes 121 and the common electrode 151 may be generated among the slits of each of the pixel electrodes 121. Even though there are provided slits between the branches of each of the pixel electrodes 121, the branches of each of the pixel electrodes 121 may be integrally formed in one piece. The branches and the slits of each of the pixel electrodes 121 may extend in a direction (i.e., a second direction Y) perpendicular to a rubbing direction (i.e., a first direction X) of a first alignment layer 160.

A liquid crystal layer 300 of the display panel 11 is the same as the liquid crystal layer 300 of the display panel 10 according to the exemplary embodiment of FIG. 1. That is, TN liquid crystal molecules are used as liquid crystal 310, and by making the rubbing direction of the first alignment layer 160 and a rubbing direction of the second alignment layer 260 differ from each other, the liquid crystal 310 and a dichroic dye 320 are twisted along a thickness direction Z.

If light polarized in the first direction X by a polarizing member 170 is provided to the liquid crystal layer 300 in an initial alignment state in which an electric field has not yet been applied to the liquid crystal layer 300, the angle the polarization direction of the polarized light forms with the n directors of the molecules of the dichroic dye 320 may be 0°. Since optical rotation occurs along the length of the liquid crystal 310 and the dichroic dye 320, which are both twisted in the thickness direction Z, the angle the polarization direction of the polarized light forms with the directors of the molecules of the dichroic dye 320 may be maintained at about 0° throughout the thickness direction Z. Accordingly, the display panel 11 may display a black image, as already discussed above with reference to FIG. 1.

Figure 7:
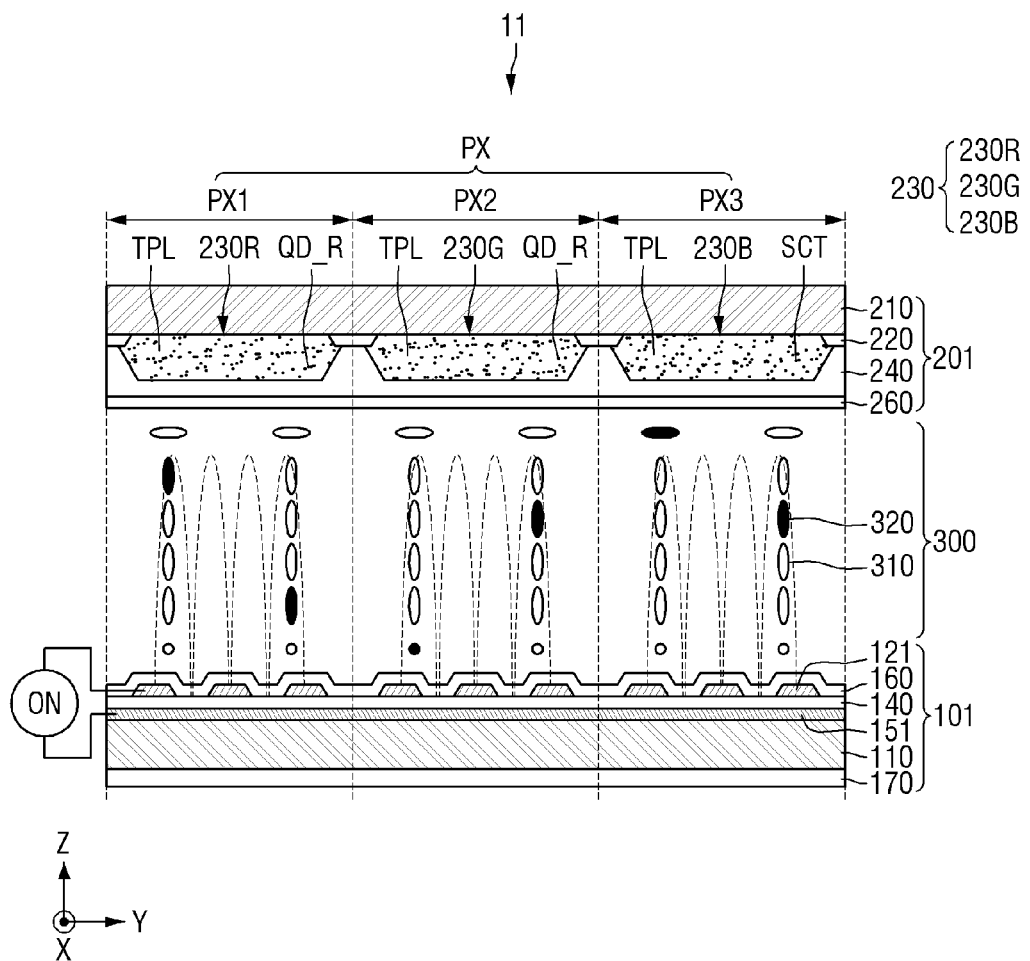
FIG. 7 is a cross-sectional view illustrating the display panel of FIG. 6 in a state in which an electric field is applied to a liquid crystal layer.

FIG. 7 is a cross-sectional view illustrating a state in which an electric field is applied to a liquid crystal layer of the display panel of FIG. 6. Referring to FIG. 7, if different voltages are applied to the pixel electrodes 121 and the common electrode 251, a horizontal electric field and a vertical electric field are generated between the pixel electrodes 121 and the common electrode 251, and the directors of the liquid crystal 310, which have positive dielectric anisotropy, rotate to be aligned in parallel to the direction of the electric field. Due to the horizontal electric field generated between the pixel electrodes 121 and the common electrode 151, the liquid crystal 310 rotates in a direction perpendicular to the direction in which the branches and the slits of each of the pixel electrodes 121 extend, i.e., the second direction Y. As mentioned above, since the directors of the molecules of the dichroic dye 320 coincide with the directors of the liquid crystal 310 in a liquid crystal mixture, the directors of the molecules of the dichroic dye 320 may also rotate to be aligned in parallel to the direction of the electric field. Then, if light polarized in the first direction X by the polarizing member 170 is provided to the liquid crystal layer 300, the angle formed by the polarization direction of the polarized light and the directors of the molecules of the dichroic dye 320 may be about 90°. Thus, a relatively small amount of light is absorbed by the dichroic dye 320 such that a large amount of light may arrive at the color adjusting patterns 230. Accordingly, the display panel 11 may display a white image without the inclusion of an additional polarizing member at the first side of the liquid crystal layer 300.

FIGS. 6 and 7 illustrate an example in which the interlayer dielectric layer 140 and the pixel electrodes 121 are disposed on a surface of the first side of the common electrode 151, as an example in which the display panel 11 has a "middle com" configuration. Alternatively, the display panel 11 may have a "top com" configuration in which the pixel electrodes 121 are disposed on the first side of the first insulating substrate 110 and the interlayer dielectric layer 140 and the common electrode 151 are disposed on a surface of a first side of the pixel electrodes 121.

Figure 8:
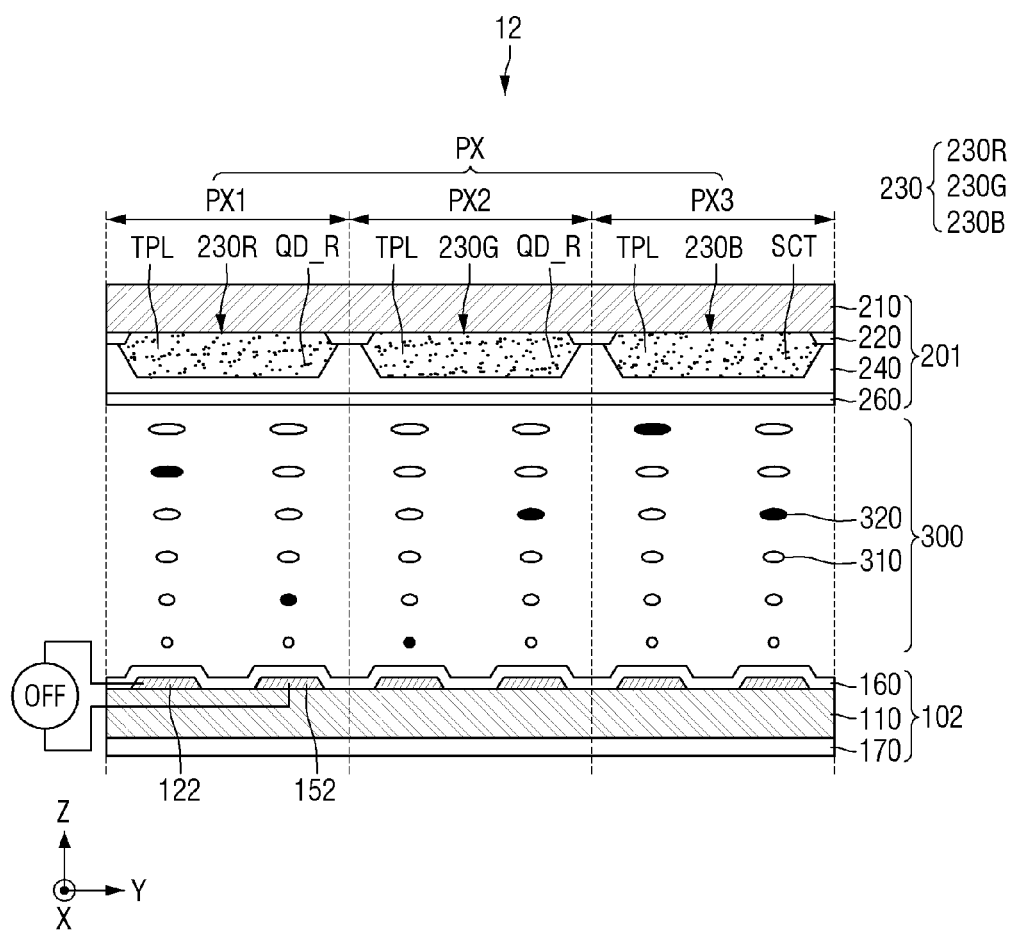
FIG. 8 is a cross-sectional view of a display panel according to another exemplary embodiment.

FIG. 8 is a cross-sectional view of a display panel according to another exemplary embodiment of the present disclosure. Referring to FIG. 8, a display panel 12 according to the present exemplary embodiment is identical to the display panel 11 according to the exemplary embodiment of FIG. 6 in that pixel electrodes 122 and common electrodes 152 are both disposed on a first substrate 102, but differs from the display panel 11 in that the pixel electrodes 122 and the common electrodes 152 are formed in the same layer. That is, FIG. 8 illustrates an In-Plane Switching (IPS)-mode LCD panel.

More specifically, the pixel electrodes 122 and the common electrodes 152 are disposed in the same layer on a first side of a first insulating substrate 110 such that the common electrodes 152 are spaced apart from each other. In a single pixel PX, the pixel electrodes 122 and the common electrodes 152 may face each other with slits interposed therebetween. Thus, a horizontal electric field between the pixel electrodes 122 and the common electrodes 152 may be generated among the slits. A direction in which the slits, the pixel electrodes 122, and the common electrodes 152 extend may be a direction (i.e., a second direction Y) perpendicular to a rubbing direction (i.e., a first direction X) of a first alignment layer 160. Even though there are slits disposed between the pixel electrodes 122 and the common electrodes 152, the common electrodes 152 may be integrally formed in a single piece. The pixel electrodes 122, the common electrodes 152, or both may be formed of an opaque metal.

Figure 9:
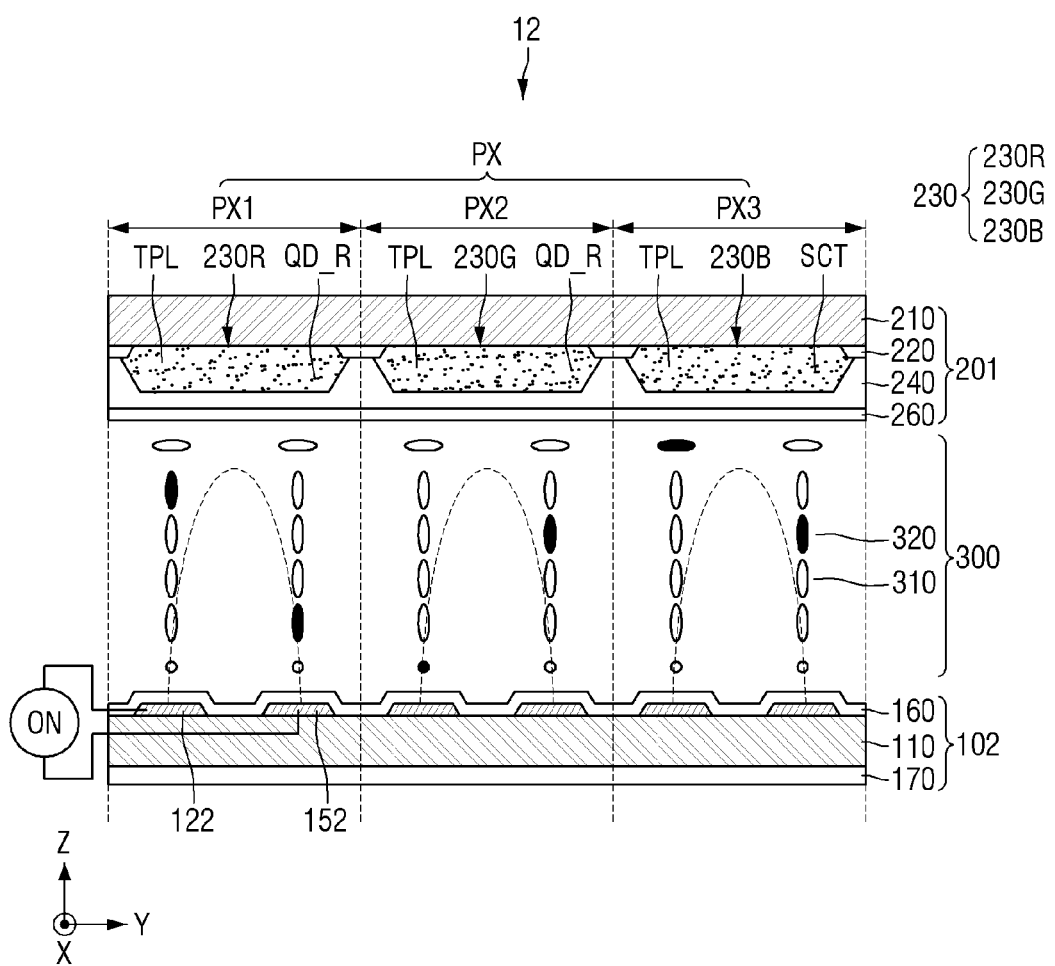
FIG. 9 is a cross-sectional view illustrating the display panel of FIG. 8 in a state in which an electric field is applied to a liquid crystal layer.

FIG. 9 is a cross-sectional view illustrating a state in which an electric field is applied to a liquid crystal layer of the display panel of FIG. 8. Referring to FIG. 8, the initial alignment state of the liquid crystal layer 300 is the same as in the exemplary embodiment of FIG. 6. Referring to FIG. 9, the alignment direction of liquid crystal 310 and a dichroic dye 320 is substantially the same as in the exemplary embodiment of FIG. 7 in which a horizontal electric field between the pixel electrodes 122 and the common electrodes 152 is generated among the slits in response to the application of an electric field to the liquid crystal layer 300. Accordingly, in the present exemplary embodiment, the display panel 12 may generate black and white images in substantially the same manner as described with reference to the exemplary embodiments of FIGS. 6 and 7.

Figure 10:
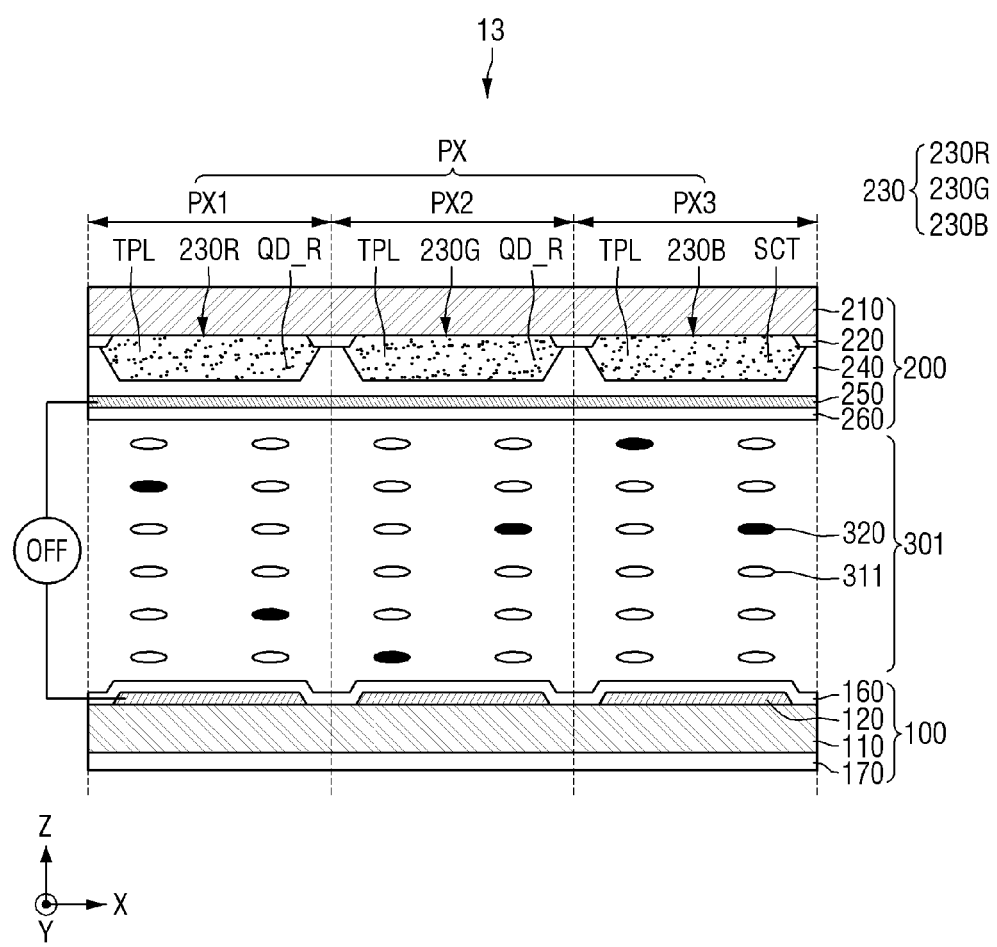
FIG. 10 is a cross-sectional view of a display panel according to another exemplary embodiment.

FIG. 10 is a cross-sectional view of a display panel according to another exemplary embodiment of the present disclosure.

Referring to FIG. 10, a display panel 13 according to the present exemplary embodiment differs from the display panel 10 according to the exemplary embodiment of FIG. 1 in that the alignment direction of a first alignment layer 160 and the alignment direction of a second alignment layer 260 are both the same as a first direction X. For convenience, the first direction X and the second direction Y of FIG. 1 are switched with each other in FIG. 10.

More specifically, liquid crystal 311 and a dichroic dye 320 of a liquid crystal layer 301 may be horizontally aligned on the first alignment layer 160 and the second alignment layer 260. The directors of the liquid crystal 311 and the dichroic dye 320 are uniformly maintained in the first direction X along a thickness direction Z. In the present exemplary embodiment, the liquid crystal 311 has positive dielectric anisotropy, but may not comprise a chiral dopant because the directors of the liquid crystal 311 are not twisted.

The arrangement of pixel electrodes 120 and a common electrode 250 is the same as in the exemplary embodiment of FIG. 1.

If light polarized in the first direction X by a polarizing member 170 is provided to the liquid crystal layer 301 in an initial alignment state in which an electric field has not yet been applied to the liquid crystal layer 301, the angle that the polarization direction of the polarized light forms with the directors of the molecules of the dichroic dye 320 may be about 0°. Since the directors of the liquid crystal 311 and the directors of the molecules of the dichroic dye 320 are uniform throughout the thickness direction Z, the angle that the polarization direction of the polarized light forms with the directors of the molecules of the dichroic dye 320 may be maintained to be about 0° throughout the thickness direction Z. Accordingly, the display panel 13 may display a black image, as already discussed above with reference to FIG. 1.

Figure 11:
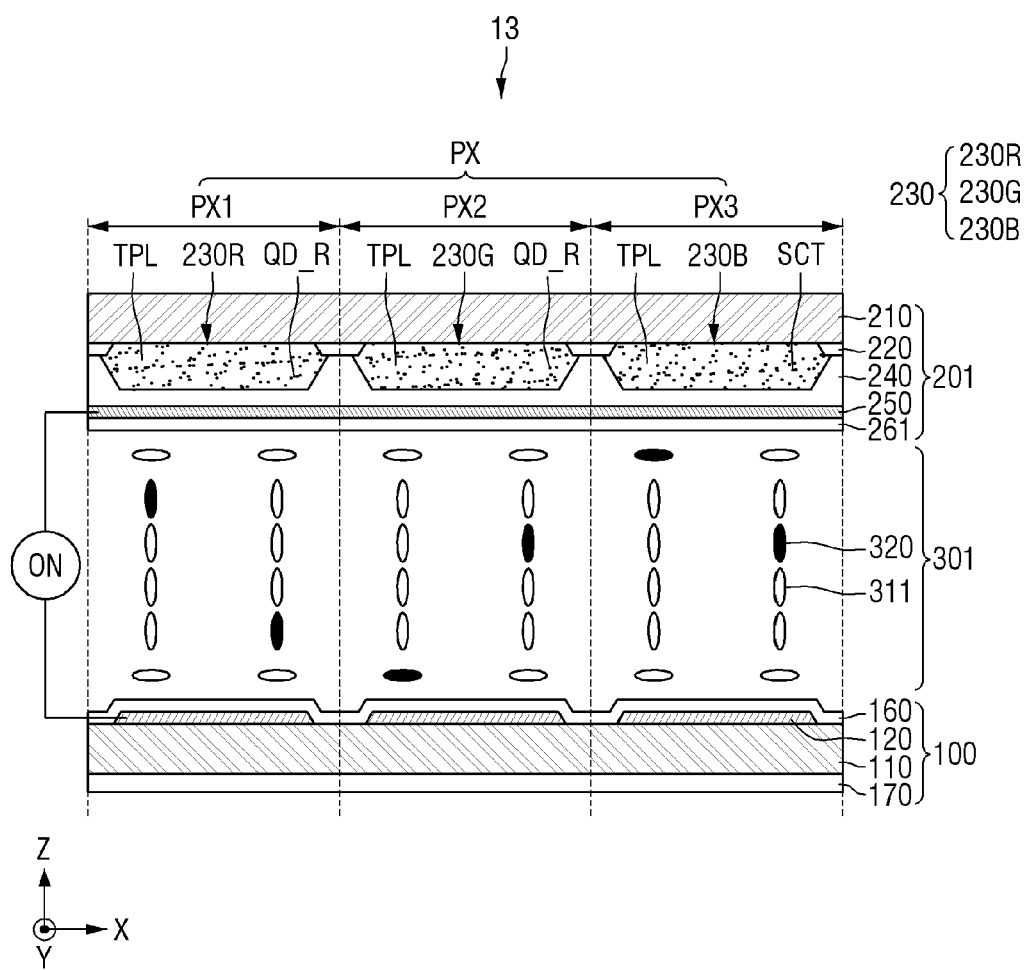
FIG. 11 is a cross-sectional view illustrating the display panel of FIG. 10 in a state in which an electric field is applied to a liquid crystal layer.

FIG. 11 is a cross-sectional view illustrating a state in which an electric field is applied to the liquid crystal layer of the display panel of FIG. 10. Referring to FIG. 11, if different voltages are applied to the pixel electrodes 120 and the common electrode 250, a vertical electric field is generated between the pixel electrodes 120 and the common electrode 250, and as a result the directors of the liquid crystal 311, which have positive dielectric anisotropy, rotate to be aligned in parallel to the direction of the electric field. As mentioned above, since the directors of the molecules of the dichroic dye 320 coincide with the directors of the liquid crystal 311 in a liquid crystal mixture, the directors of the molecules of the dichroic dye 320 may also rotate to be aligned in parallel to the direction of the electric field. Then, if light polarized in the first direction X by a polarizing member 170 is provided to the liquid crystal layer 301, the angle formed by the polarization direction of the polarized light and the directors of the molecules of the dichroic dye 320 may be about 90°. Most of the liquid crystal 311 and the molecules of the dichroic dye 320 may have the same angle (i.e., an angle perpendicular to a first substrate 100) throughout the thickness direction Z, the exception being the liquid crystal 311 and molecules of the dichroic dye 320 which are present in areas directly regulated by the alignment force of the first alignment layer 160 and the second alignment layer 260. Thus, a relatively small amount of light is absorbed by the dichroic dye 320 such that a large amount of light may arrive at the color adjusting patterns 230. Accordingly, the display panel 13 may display a white image without the inclusion of an additional polarizing member at a first side of the liquid crystal layer 301.

Figure 12:
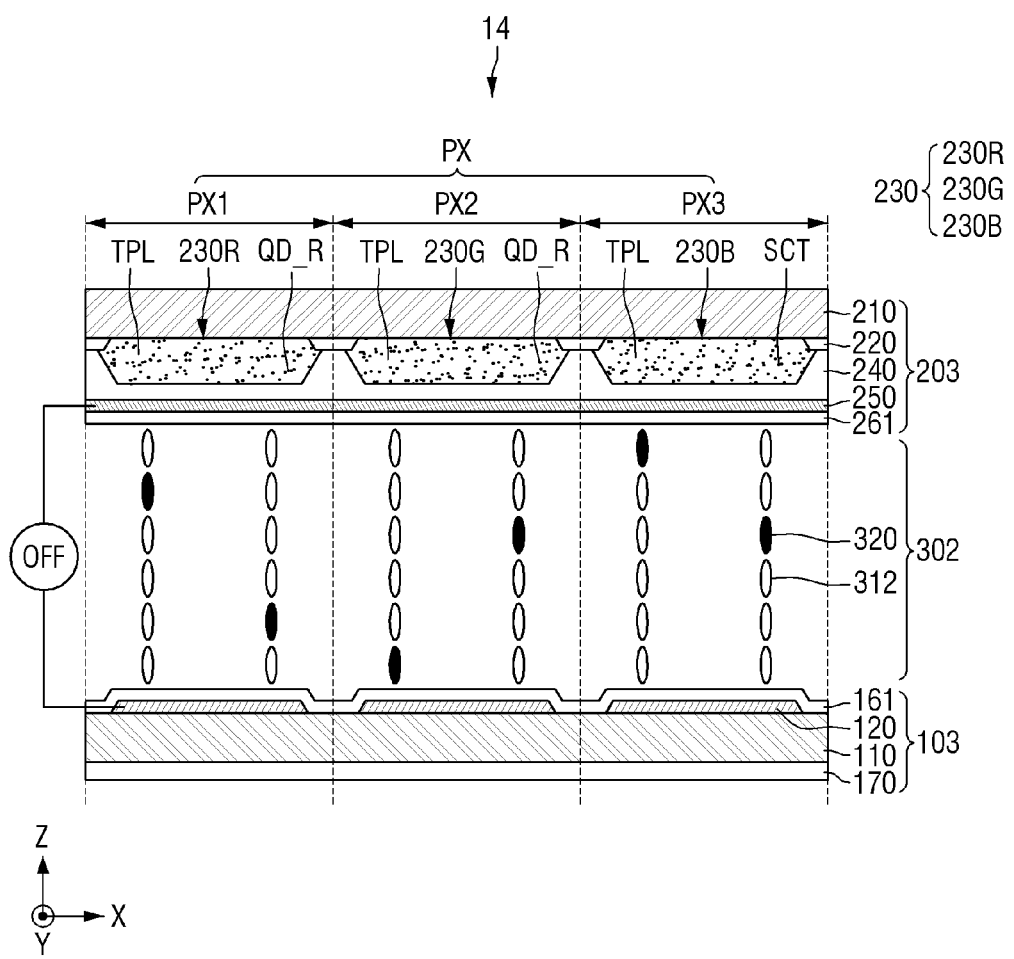
FIG. 12 is a cross-sectional view of a display panel according to another exemplary embodiment.

FIG. 12 is a cross-sectional view of a display panel according to another exemplary embodiment of the present disclosure.

Referring to FIG. 12, a display panel 14 according to the present exemplary embodiment differs from the display panel 10 according to the exemplary embodiment of FIG. 1 in that liquid crystal 312 is initially vertically aligned on a first alignment layer 161 of a first substrate 103 and a second alignment layer 261 of a second substrate 203. For convenience, the first direction X and the second direction Y of FIG. 1 are switched with each other in FIG. 12.

More specifically, the liquid crystal 312 and a dichroic dye 320 of a liquid crystal layer 302 are vertically aligned on the first alignment layer 161 and the second alignment layer 261. In the present exemplary embodiment, the liquid crystal 312 has negative dielectric anisotropy. Thus, if an electric field is applied to the liquid crystal layer 302, the directors of the liquid crystal 312 and the dichroic dye 320 are aligned in a horizontal direction. The first alignment layer 161 and the second alignment layer 261 are vertical alignment layers, but may be rubbed or photo-aligned in the first direction X. Since the first alignment layer 161 and the second alignment layer 261 have a physical alignment capability in the first direction X, the first alignment layer 161 and the second alignment layer 261 may determine a direction in which the liquid crystal 312 are to be aligned over a plane in response to the application of an electric field to the liquid crystal layer 302.

If light polarized in the first direction X by a polarizing member 170 is provided to the liquid crystal layer 302 in an initial alignment state in which an electric field has not yet been applied to the liquid crystal layer 302, the angle between the polarization direction of the polarized light forms and the directors of the molecules of the dichroic dye 320 may be about 90°. Since the directors of the liquid crystal 311 and the directors of the molecules of the dichroic dye 320 are uniform throughout the thickness direction Z, the angle between the polarization direction of the polarized light and the directors of the molecules of the dichroic dye 320 may be maintained at about 90° throughout the thickness direction Z. Accordingly, the display panel 14 may display a white image, as already discussed above with reference to FIG. 3. That is, the display panel 14 may be in a normally white mode in which a white image is displayed in the absence of an electric field. In the present exemplary embodiment, since the directors of the liquid crystal 312 and the dichroic dye 320 form an angle of about 90° with the polarization direction of polarized light applied to the liquid crystal layer 302, even in areas near the first alignment layer 161 and the second alignment layer 261, sufficient transmittance may be secured in a white mode.

Figure 13:
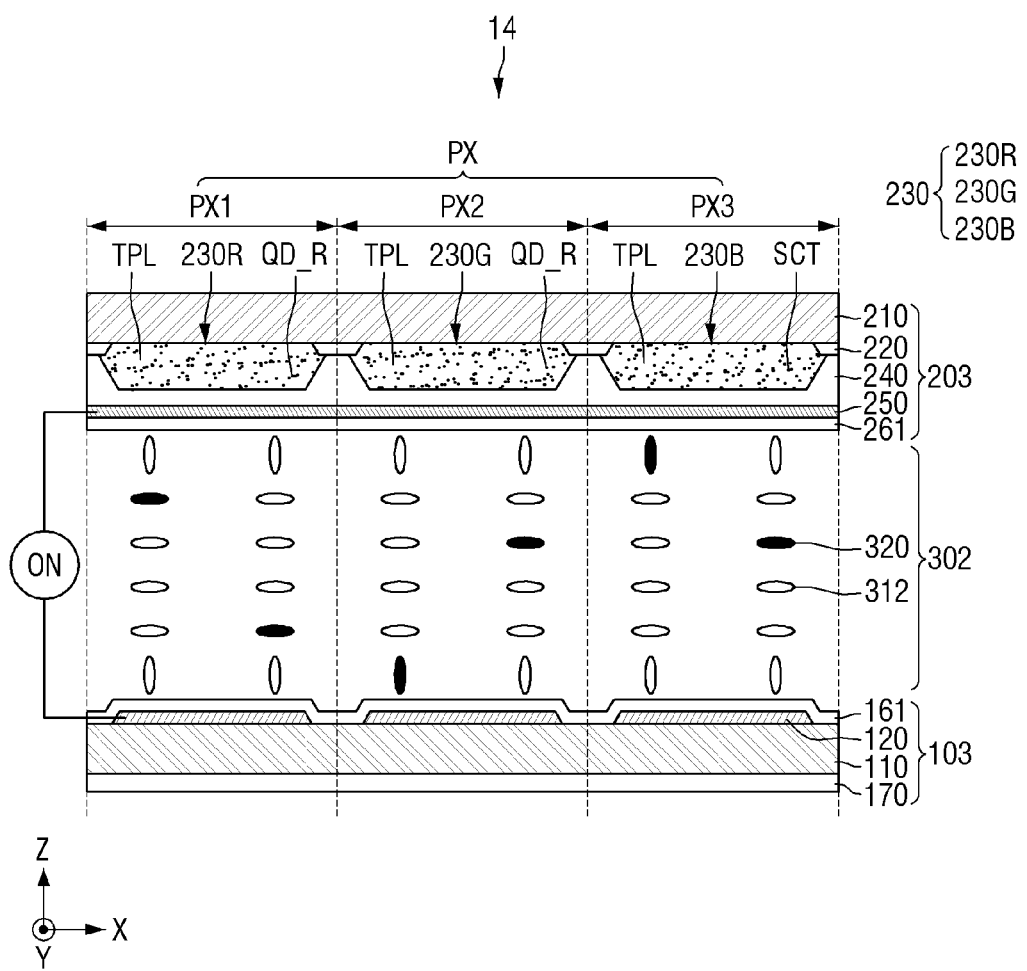
FIG. 13 is a cross-sectional view illustrating the display panel of FIG. 12 in a state in which an electric field is applied to the liquid crystal layer.

FIG. 13 is a cross-sectional view illustrating a state in which an electric field is applied to the liquid crystal layer of the display panel of FIG. 12. Referring to FIG. 13, if different voltages are applied to the pixel electrodes 120 and the common electrode 250 and as a result, a vertical electric field is generated between the pixel electrodes 120 and the common electrode 250, the directors of the liquid crystal 312, which have negative dielectric anisotropy, rotate to be aligned in a direction perpendicular to the direction of the electric field. As mentioned above, since the directors of the molecules of the dichroic dye 320 coincide with the directors of the liquid crystal 312 in a liquid crystal mixture, the directors of the molecules of the dichroic dye 320 may also rotate to be aligned in a direction perpendicular to the direction of the electric field.

Theoretically, the liquid crystal 312 and the dichroic dye 320 may rotate in plane in various directions when liquid crystal 312 and dichroic dye 320 are rotated by the vertical electric field. The liquid crystal 312 may form various angles with the polarization direction of light applied to the liquid crystal layer 302 depending on a direction in which they are to be aligned. However, as described above, since the first alignment layer 161 and the second alignment layer 261 are treated to have a physical alignment capability in the first direction X, the liquid crystal 312 may be aligned in the first direction X. Then, if light polarized in the first direction X by a polarizing member 170 is provided to the liquid crystal layer 302, the angle formed by the polarization direction of the polarized light and the directors of the molecules of the dichroic dye 320 may be about 0°. Thus, a relatively large amount of light is absorbed by the dichroic dye 320 such that a small amount of light may arrive at the color adjusting patterns 230. Accordingly, the display panel 14 may display a black image without the inclusion of an additional polarizing member at a first side of the liquid crystal layer 302.

Figure 14:
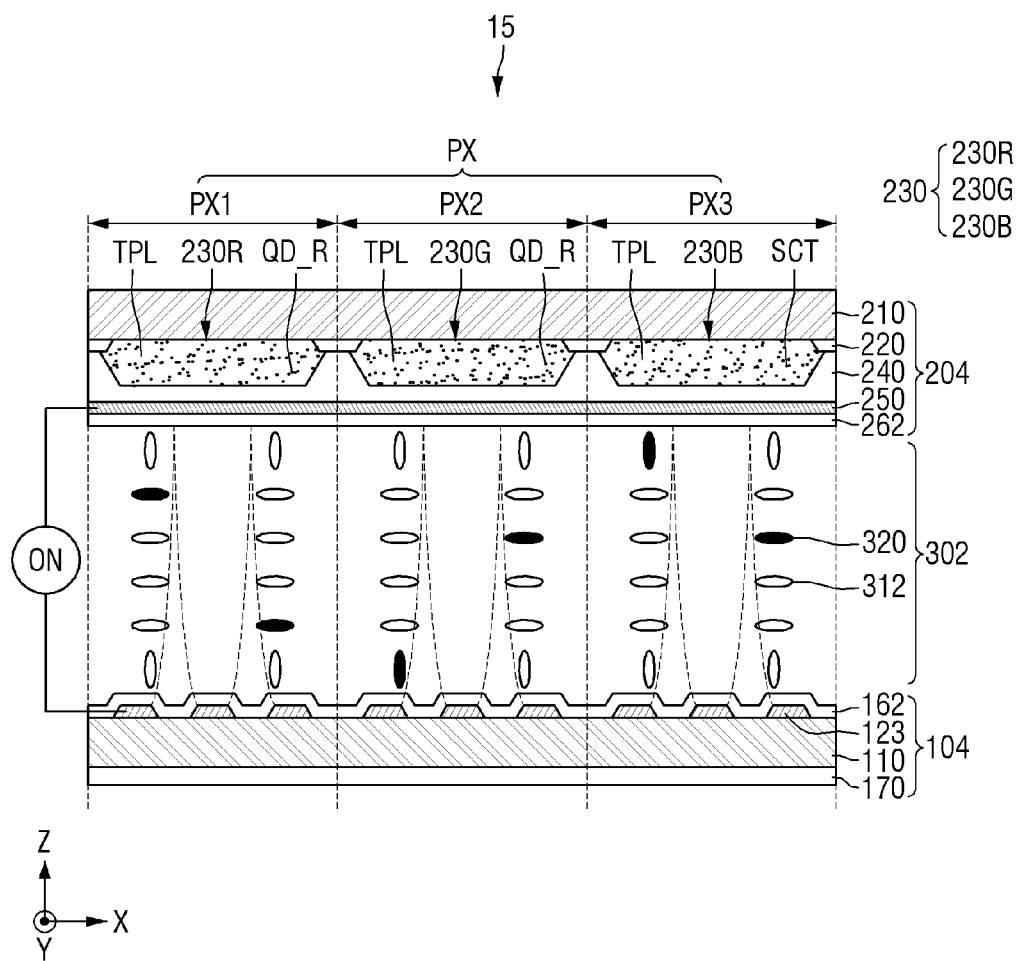
FIG. 14 is a cross-sectional view of a display panel according to another exemplary embodiment of the present disclosure.

FIG. 14 is a cross-sectional view of a display panel according to another exemplary embodiment of the present disclosure. FIG. 14 also illustrates a state in which an electric field is applied to a liquid crystal layer of the display panel of FIG. 13.

Referring to FIG. 14, a display panel 15 according to the present exemplary embodiment differs from the display panel 14 according to the exemplary embodiment of FIG. 12 in that each of a plurality of pixel electrodes 123 includes branches and slits, with the slits disposed between the branches.

More specifically, the branches and the slits of each of the pixel electrodes 123 extend in a direction (i.e., a second direction Y) perpendicular to a first direction X. Due to this structure, a fringe field may be generated among the branches of each of the pixel electrodes 123 in response to the application of an electric field to a liquid crystal layer 302. The fringe field may determine a direction in which liquid crystal 312 is to be aligned over a plane. Thus, in response to the application of an electric field to the liquid crystal layer 302, the liquid crystal 312 and a dichroic dye 320 may be effectively aligned along a first direction X. A first alignment layer 162 of a first substrate 104 and a second alignment layer 262 of a second substrate 204 may be rubbed or photo-aligned in the first direction X, as in the exemplary embodiment of FIG. 12, but no additional horizontal alignment force, other than vertical alignment force, may be imparted to the first alignment layer 162 and the second alignment layer 262.

In the present exemplary embodiment, each of the pixel electrodes 123 includes branches and slits, and the direction in which the liquid crystal 312 is aligned is regulated by a fringe field formed by the branches and the slits of each of the pixel electrodes 123. Alternatively, the common electrode 250, instead of the pixel electrodes 123, may be formed to include branches and slits, and the direction in which the liquid crystal 312 is aligned is regulated by a fringe field formed by the branches and the slits of the common electrode 250. Still alternatively, each of the pixel electrodes 123 and the common electrode 250 may both be formed to include branches and slits.

As an alternative example of how to regulate the direction in which the liquid crystal 312 is aligned, projections may be formed on a first insulating substrate 110. The projections may be formed at the positions of, for example, the slits of FIG. 14. In some exemplary embodiments, both slits and projections may be provided.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display device comprising:
    a plurality of pixels;
    a first substrate comprising a pixel electrode disposed in a pixel of the plurality of pixels;
    a second substrate facing the first substrate, the second substrate comprising a color adjusting pattern, which is disposed in the pixel of the plurality of pixels, and a common electrode, which is disposed on the color adjusting pattern; and
    a liquid crystal layer interposed between the first substrate and the second substrate, and comprising a liquid crystal and a dichroic dye,
    wherein:
    the plurality of pixels comprises a first-color pixel, which is configured to display a first color, and a second-color pixel, which is configured to display a second color different from the first color;
    the color adjusting pattern comprises a first color adjusting pattern, which is disposed in the first-color pixel, and a second color adjusting pattern, which is disposed in the second-color pixel; and
    the first color adjusting pattern is configured to convert a wavelength of incident light into a first color, and the second color adjusting pattern is configured to convert the wavelength of incident light into a second-color wavelength.

2. The display device of claim 1, wherein:
    the plurality of pixels further comprise a third-color pixel, which is configured to display a third color different from the first color and the second color; and
    the color adjusting pattern further comprises a third color adjusting pattern, which is disposed in the third-color pixel and is configured to convert the wavelength of incident light into a third-color wavelength.

3. The display device of claim 2, further comprising:
    a light source assembly disposed on a surface of the first substrate, and comprising a blue light source.

4. The display device of claim 3, wherein the third color adjusting pattern further comprises light scattering particles.

5. The display device of claim 4, wherein the dichroic dye comprises at least one anthraquinone dye selected from structures 1 to 4 of Formula 1:

Formula 1

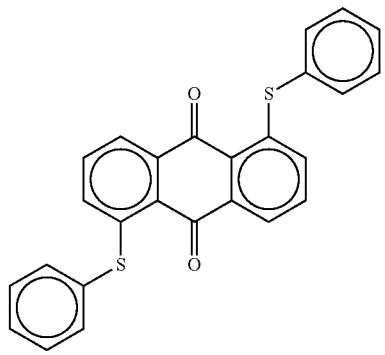

1

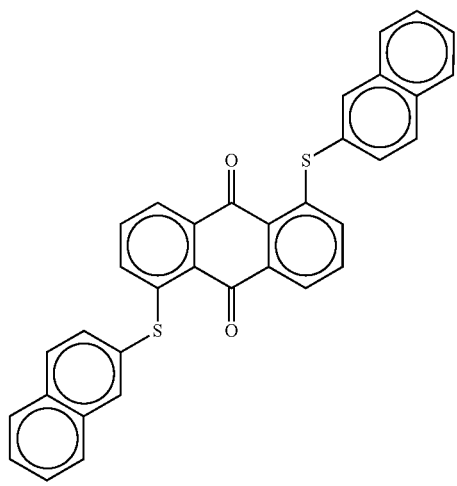

2

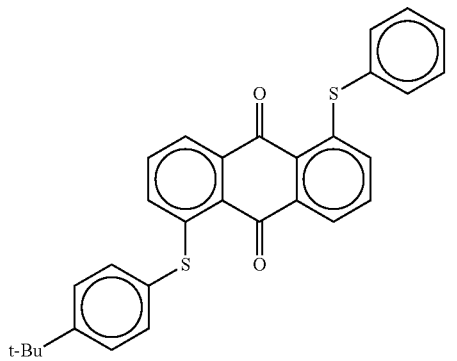

3

-continued

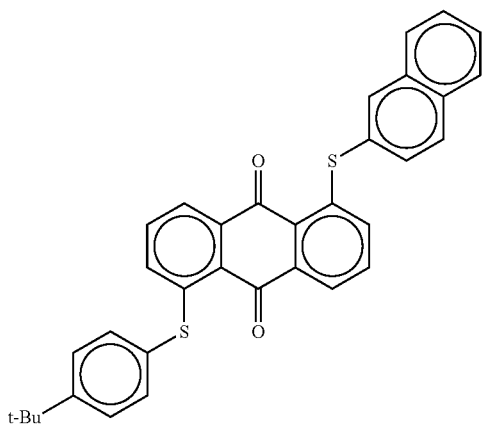

4

6. The display device of claim 1, wherein:
the first substrate further comprises a first alignment layer aligned in a first direction;
the second substrate further comprises a second alignment layer aligned in a second direction different from the first direction; and
the liquid crystal layer is disposed between the first alignment layer and the second alignment layer.

7. The display device of claim 6, wherein the liquid crystal comprises a chiral dopant, and the liquid crystal is a twisted nematic (TN) liquid crystal, which is twisted and horizontally aligned between the first alignment layer and the second alignment layer.

8. The display device of claim 7, wherein the liquid crystal layer has a u value of about a square root of 15, wherein u is determined by following Equation 11:

$$u = \frac{2\Delta nd}{\lambda}$$  Equation 11 where d is a cell gap of the liquid crystal layer, $\Delta n$ is a refractive index anisotropy of the liquid crystal, and $\lambda$ is a wavelength of light incident upon the liquid crystal layer from the blue light source.

9. The display device of claim 1, wherein:
the first substrate further comprises a first alignment layer;
the second substrate further comprises a second alignment layer having a same alignment direction as the first alignment layer; and
the liquid crystal is horizontally aligned on the first alignment layer and on the second alignment layer.

10. The display device of claim 1, wherein:
the first substrate further comprises a first alignment layer;
the second substrate further comprises a second alignment layer having a same alignment direction as the first alignment layer; and
the liquid crystal is vertically aligned on the first alignment layer and on the second alignment layer.

11. The display device of claim 1, wherein:
the pixel electrode comprises branches and slits, the slits being disposed between the branches; and
a direction in which the branches extends is the same as a direction in which the slits extend.

12. The display device of claim 1, further comprising:
a polarizing member disposed on a surface of the first substrate.

13. The display device of claim 12, wherein the polarizing member is not interposed between the liquid crystal layer and the color adjusting pattern.

14. A display device comprising:
a plurality of pixels;
a first substrate comprising a pixel electrode disposed in a pixel of the plurality of pixels, and a common electrode, which is electrically insulated from the pixel electrode;
a second substrate facing the first substrate and comprising a color adjusting pattern disposed in a pixel of the plurality of pixels; and
a liquid crystal layer interposed between the first substrate and the second substrate, and comprising liquid crystal and a dichroic dye,
wherein:
the pixels comprise a first-color pixel, which is configured to display a first color, and a second-color pixel, which is configured to display a second color different from the first color;
the color adjusting pattern comprises a first color adjusting pattern, which is disposed in the first-color pixel, and a second color adjusting pattern, which is disposed in the second-color pixel; and
the first color adjusting pattern is configured to convert a wavelength of incident light into a first color wavelength, and the second color adjusting pattern is configured to convert the wavelength of incident light into a second-color wavelength.

15. The display device of claim 14, wherein:
the plurality of pixels further comprise a third-color pixel, which is configured to display a third color different from the first color and the second color; and
the color adjusting pattern further comprises a third color adjusting pattern, which is disposed in the third-color pixel and is configured to convert the wavelength of incident light into a third-color wavelength.

16. The display device of claim 15, further comprising:
a light source assembly disposed on a surface of the first substrate and comprising a blue light source.

17. The display device of claim 16, wherein the third color adjusting pattern further comprises light scattering particles.

18. The display device of claim 17, wherein the dichroic dye comprises at least one anthraquinone dye selected from structures 1 to 4 of Formula 1:

Formula 1

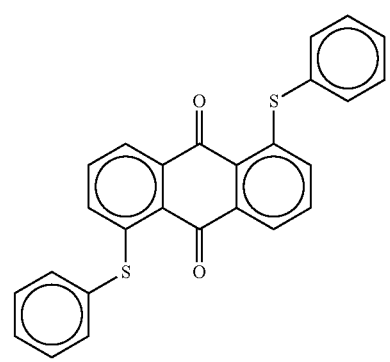

1

-continued

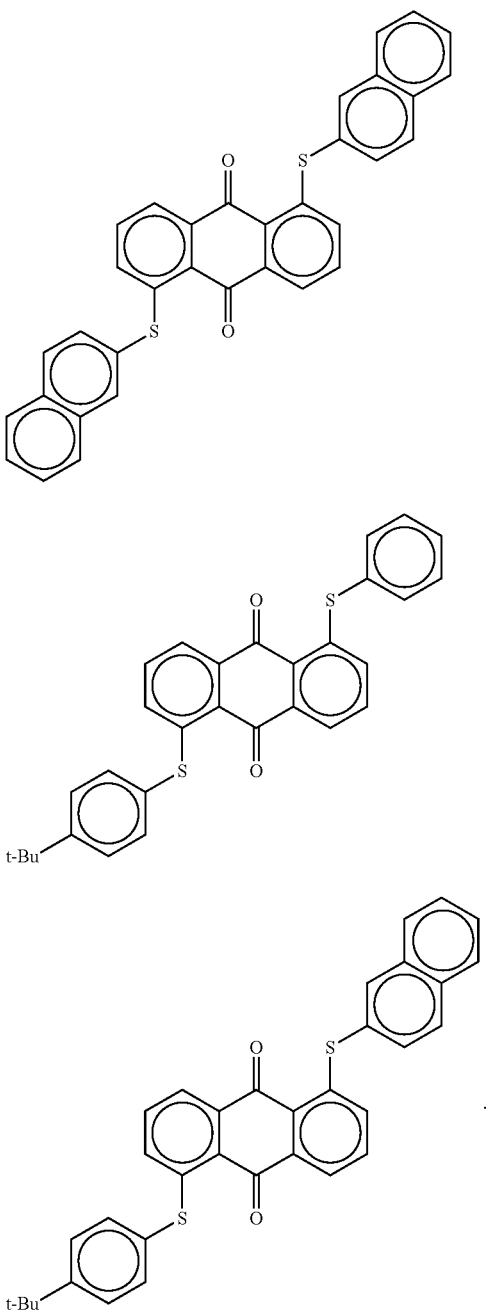

19. The display device of claim 14, wherein:
the first substrate further comprises a first alignment layer aligned in a first direction;
the second substrate further includes a second alignment layer aligned in a second direction different from the first direction; and
the liquid crystal layer is disposed between the first alignment layer and the second alignment layer.

20. The display device of claim 19, wherein the liquid crystal comprises a chiral dopant and the liquid crystal is a twisted nematic liquid crystal, which are twisted and horizontally aligned between the first alignment layer and the second alignment layer.

21. The display device of claim 20, wherein the liquid crystal layer has a u value of about a square root of 15, wherein u is determined by following Equation 11:

$$u = \frac{2\Delta nd}{\lambda} \quad \text{Equation 11}$$

where d is a cell gap of the liquid crystal layer, Δn is a refractive index anisotropy of the liquid crystal, and λ is a wavelength of light incident upon the liquid crystal layer from the blue light source.

22. The display device of claim 19, wherein:
the first substrate further comprises an interlayer dielectric layer interposed between the pixel electrode and the common electrode.

23. The display device of claim 22, wherein:
pixel electrode comprises branches and slits, the slits being disposed between the branches; and
a direction in which the branches extend and a direction in which the slits extend are the same as the second direction.

24. The display device of claim 19, wherein the pixel electrode and the common electrode are disposed in the same layer and are spaced apart from each other.

25. The display device of claim 23, wherein:
the pixel electrode and the common electrode face each other with the slits of the pixel electrode interposed therebetween; and
a direction in which the slits of the pixel electrode extend is the same as the second direction, and a direction in which the pixel electrode and the common electrode extend is the same as the second direction.

26. The display device of claim 14, further comprising:
a polarizing member disposed on a surface of the first substrate.

27. The display device of claim 26, wherein the polarizing member is not interposed between the liquid crystal layer and the color adjusting pattern.

* * * * *